(12) United States Patent
Bates et al.

(10) Patent No.: US 7,768,683 B2
(45) Date of Patent: *Aug. 3, 2010

(54) APPARATUS AND METHOD TO ALIGN THE ELEMENTS OF A HOLOGRAPHIC INFORMATION DATA STORAGE SYSTEM

(75) Inventors: Allen Keith Bates, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 643 days.

This patent is subject to a terminal disclaimer.

(21) Appl. No.: 11/622,931

(22) Filed: Jan. 12, 2007

(65) Prior Publication Data

US 2008/0170281 A1     Jul. 17, 2008

(51) Int. Cl.
*G03H 1/08* (2006.01)
*G02B 5/32* (2006.01)
*G06K 9/76* (2006.01)

(52) U.S. Cl. .............................. 359/9; 359/21; 382/210
(58) Field of Classification Search .................... 359/21
See application file for complete search history.

(56) References Cited

U.S. PATENT DOCUMENTS

| | | | |
|---|---|---|---|
| 6,614,741 B1 | 9/2003 | Hesselink et al. | |
| 6,625,100 B2 | 9/2003 | Edwards | |
| 6,922,385 B2 | 7/2005 | Edwards | |
| 7,034,971 B2 | 4/2006 | Edwards et al. | |
| 2008/0181082 A1* | 7/2008 | Bates et al. | 369/103 |

\* cited by examiner

*Primary Examiner*—Stephone B Allen
*Assistant Examiner*—Jade R Callaway
(74) *Attorney, Agent, or Firm*—Dale F. Regelman; Quarles & Brady LLP

(57) ABSTRACT

A method to align the write channel portion of a holographic data storage system, wherein the method establishes a write threshold correlation factor, provides a reference beam, and illuminates a holographic data storage medium encoded with a write reference orientation image with the reference beam to generate a write channel alignment data beam including a projected write reference orientation image. The method projects the write channel alignment data beam onto an optical detector, and calculates a first write correlation factor using the projected write reference orientation image, a stored write reference orientation image, and the tangential matched filter. If the method determines that the first write correlation factor is greater than or equal to the write threshold correlation factor, then the method determines that the spatial write channel is properly aligned.

11 Claims, 18 Drawing Sheets

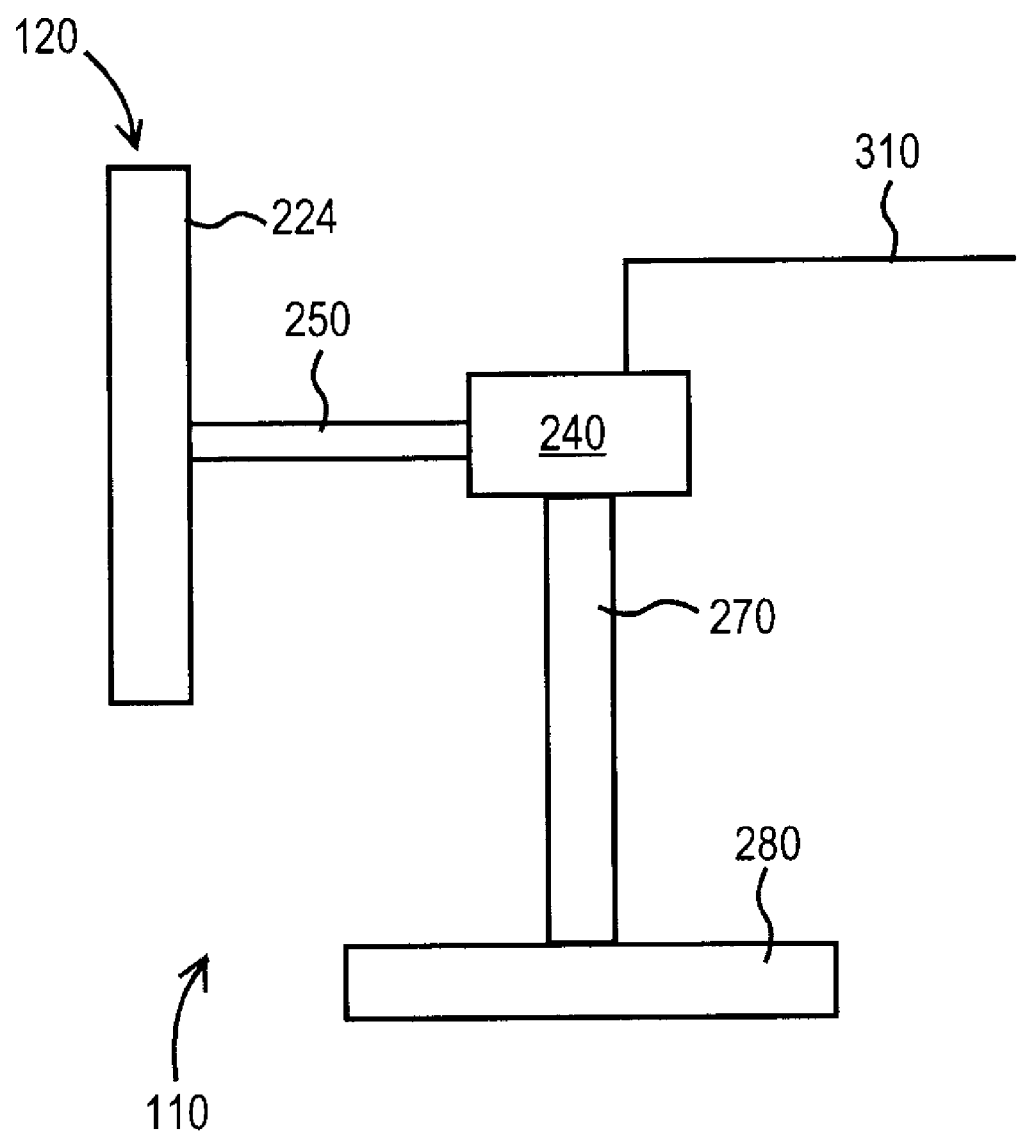

APPARATUS AND METHOD TO ALIGN THE ELEMENTS OF A HOLOGRAPHIC INFORMATION DATA STORAGE SYSTEM

FIELD OF THE INVENTION

This invention relates to an apparatus, and method using that apparatus, align the elements of a holographic information data storage system.

BACKGROUND OF THE INVENTION

In holographic information storage, an entire page of information is stored at once as an optical interference pattern within a thick, photosensitive optical material. This is done by intersecting two coherent laser beams within the storage material. The first, called the data beam, contains the information to be stored; the second, called the reference beam, is designed to be simple to reproduce—for example, a simple collimated beam with a planar wavefront.

The resulting optical interference pattern, of the two coherent laser beams, causes chemical and/or physical changes in the photosensitive medium: a replica of the interference pattern is stored as a change in the absorption, refractive index, or thickness of the photosensitive medium. When the stored interference pattern is illuminated with one of the two waves that was used during recording, some of this incident light is diffracted by the stored interference pattern in such a fashion that the other wave is reconstructed. Illuminating the stored interference pattern with the reference wave reconstructs the data beam, and vice versa.

A large number of these interference patterns can be superimposed in the same thick piece of media and can be accessed independently, as long as they are distinguishable by the direction or the spacing of the patterns. Such separation can be accomplished by changing the angle between the object and reference wave or by changing the laser wavelength. Any particular data page can then be read out independently by illuminating the stored patterns with the reference wave that was used to store that page. Because of the thickness of the hologram, this reference wave is diffracted by the interference patterns in such a fashion that only the desired object beam is significantly reconstructed and imaged on an electronic camera. The theoretical limits for the storage density of this technique are on the order of tens of terabits per cubic centimeter.

SUMMARY OF THE INVENTION

To reliably encode information into the holographic data storage medium, what is needed is an apparatus and method to align the spatial light modulator used to form data beams. To reliably decode information encoded in the holographic data storage medium what is needed is an apparatus and method to align the optical detector used to receive the reconstructed data beams. Applicants' invention comprises an apparatus and method to align the spatial light modulator, and to align the optical detector.

Applicants' invention comprises an apparatus and method to align a spatial light modulator disposed in a holographic data storage system. The method supplies a holographic data storage system comprising a light source, a stored write reference orientation image, a holographic data storage medium encoded with the write reference orientation image a tangential matched filter, a first rotated matched filter, a second rotated matched filter and an optical detector.

The method establishes a write threshold correlation factor, provides a reference beam, and illuminates the encoded holographic data storage medium with that reference beam to generate a write channel alignment data beam comprising a projected write reference orientation image. The method projects the write channel alignment data beam onto the optical detector, calculates a first write correlation factor using the projected write reference orientation image, the stored write reference orientation image, and the tangential matched filter. If the method determines that the first write correlation factor is greater than or equal to the write threshold correlation factor, then the method determines that the spatial light modulator is properly aligned.

BRIEF DESCRIPTION OF THE DRAWINGS

The invention will be better understood from a reading of the following detailed description taken in conjunction with the drawings in which like reference designators are used to designate like elements, and in which:

FIG. 3 is a side view of a second embodiment of Applicants' spatial light modulator;

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
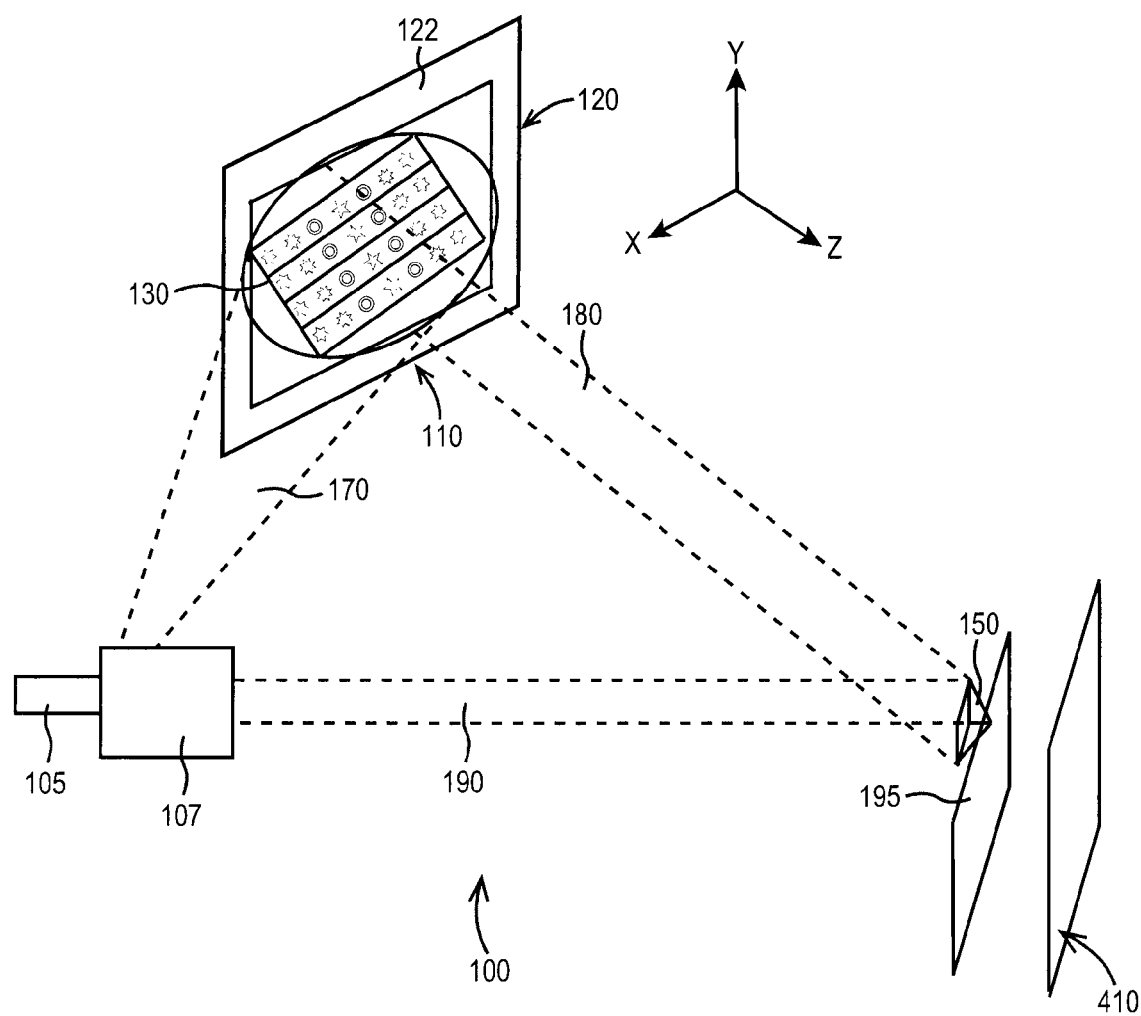
FIG. 1A is a perspective view of Applicants' holographic data storage system as used to encode information into a holographic data storage medium.
Figure 1B:
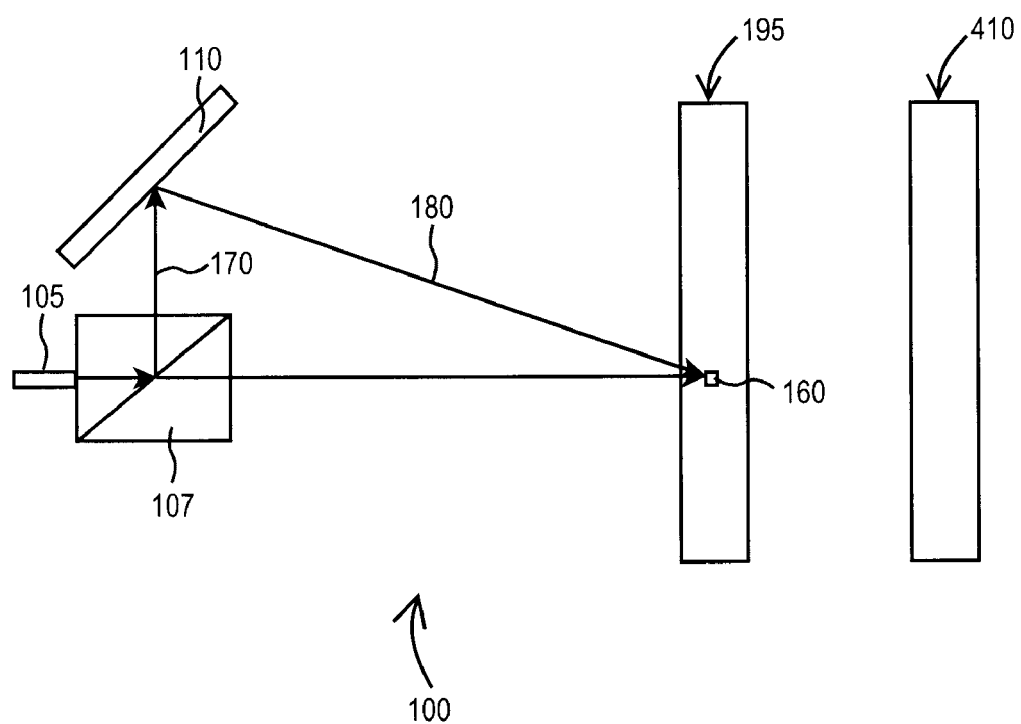
FIG. 1B is a top view of the apparatus of FIG. 1A.

Referring now to FIGS. 1A and 1B, holographic information recording apparatus 100 (FIGS. 1A, 1B, 4A, 4B) comprises laser light source 105, beam splitter 107, reflective spatial light modulator 110, and holographic storage medium 195. The light generated by source 105 is split by beam splitter 107 into reference beam 190, and carrier beam 170.

Figure 12:
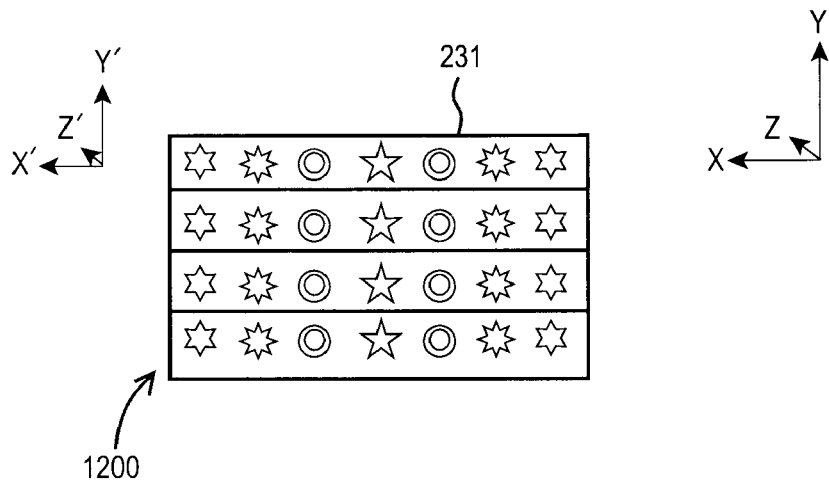
FIG. 12 shows one embodiment of Applicants' write reference orientation image as seen through a tangential matched filter.

Reflective spatial light modulator ("RSLM") 110 comprises display screen 120. In the illustrated embodiment of FIG. 1, an image 130 is shown displayed on display screen 120 wherein image 120 comprises write reference orientation image 231 (FIG. 12). In certain embodiments, display screen 120 comprises an active region 122 comprising an assembly comprising a plurality of micro mirrors. In other embodiments, active region 122 comprises a liquid crystal on silicon ("LCOS") display device. In contrast to nematic twisted liquid crystals used in LCDs, in which the crystals and electrodes are sandwiched between polarized glass plates, LCOS devices have the liquid crystals coated over the surface of a silicon chip. The electronic circuits that drive the formation of the image are etched into the chip, which is coated with a reflective (aluminized) surface. The polarizers are located in the light path both before and after the light bounces off the chip. LCOS devices are easier to manufacture than conventional LCD displays. LCOS devices have higher resolution because several million pixels can be etched onto one chip. LCOS devices can be much smaller than conventional LCD displays.

Carrier beam 170 picks up image 130 as the light is reflected off display screen 120 to form reflected data beam 180 comprising image 130. Unreflected reference beam 190 interferes with data beam 180 to form interference pattern 160 which is stored as hologram 150, wherein hologram 150 comprises the interference of Applicants' image 130 and reference beam 190. Hologram 150 is formed within storage medium 195 thereby causing the photo-active storage medium to store interference pattern 160 (FIG. 1B) as encoded hologram 150.

Figure 2A:
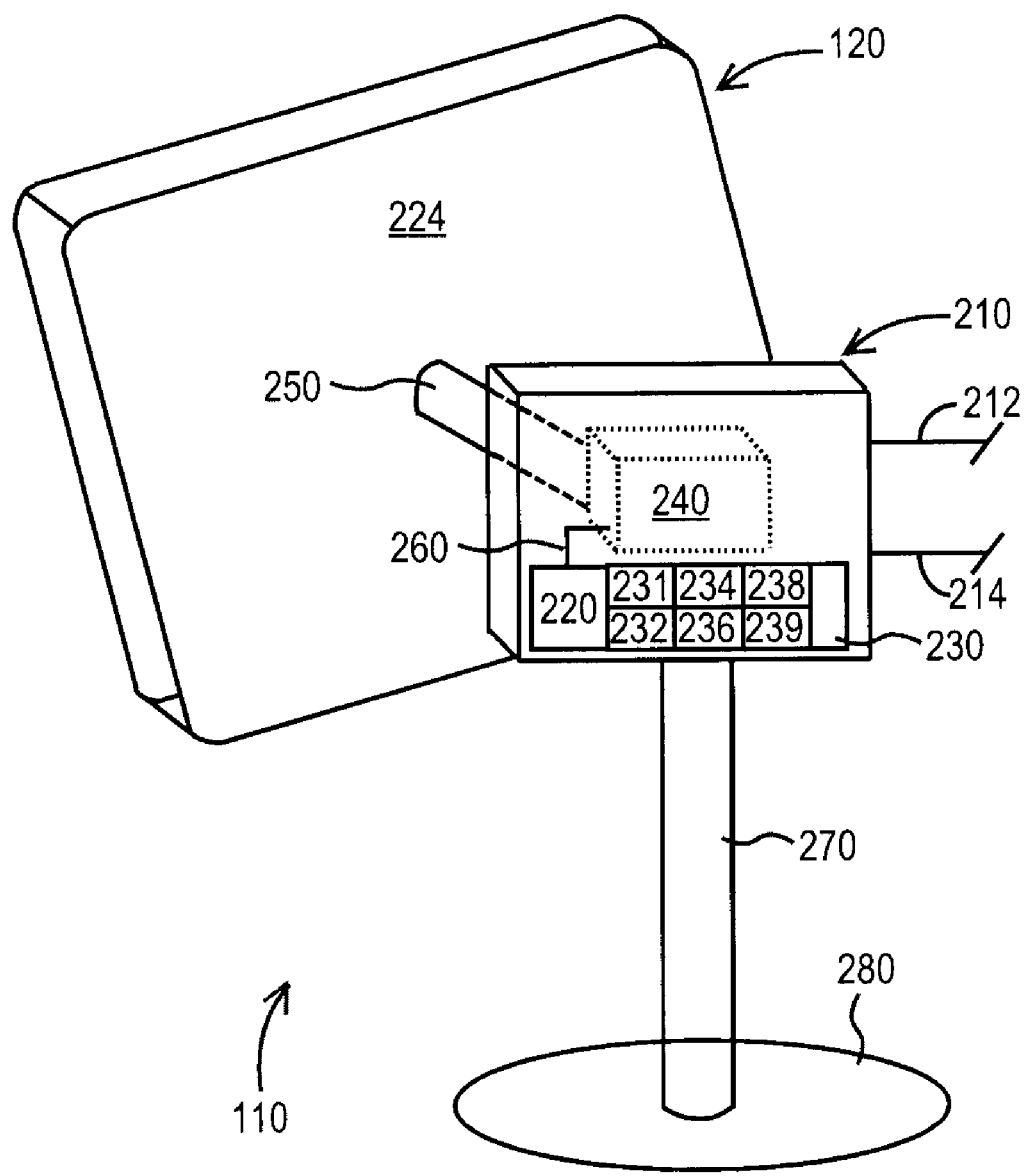
FIG. 2A is a perspective view of a portion of one embodiment of Applicants' spatial light modulator.
Figure 2B:
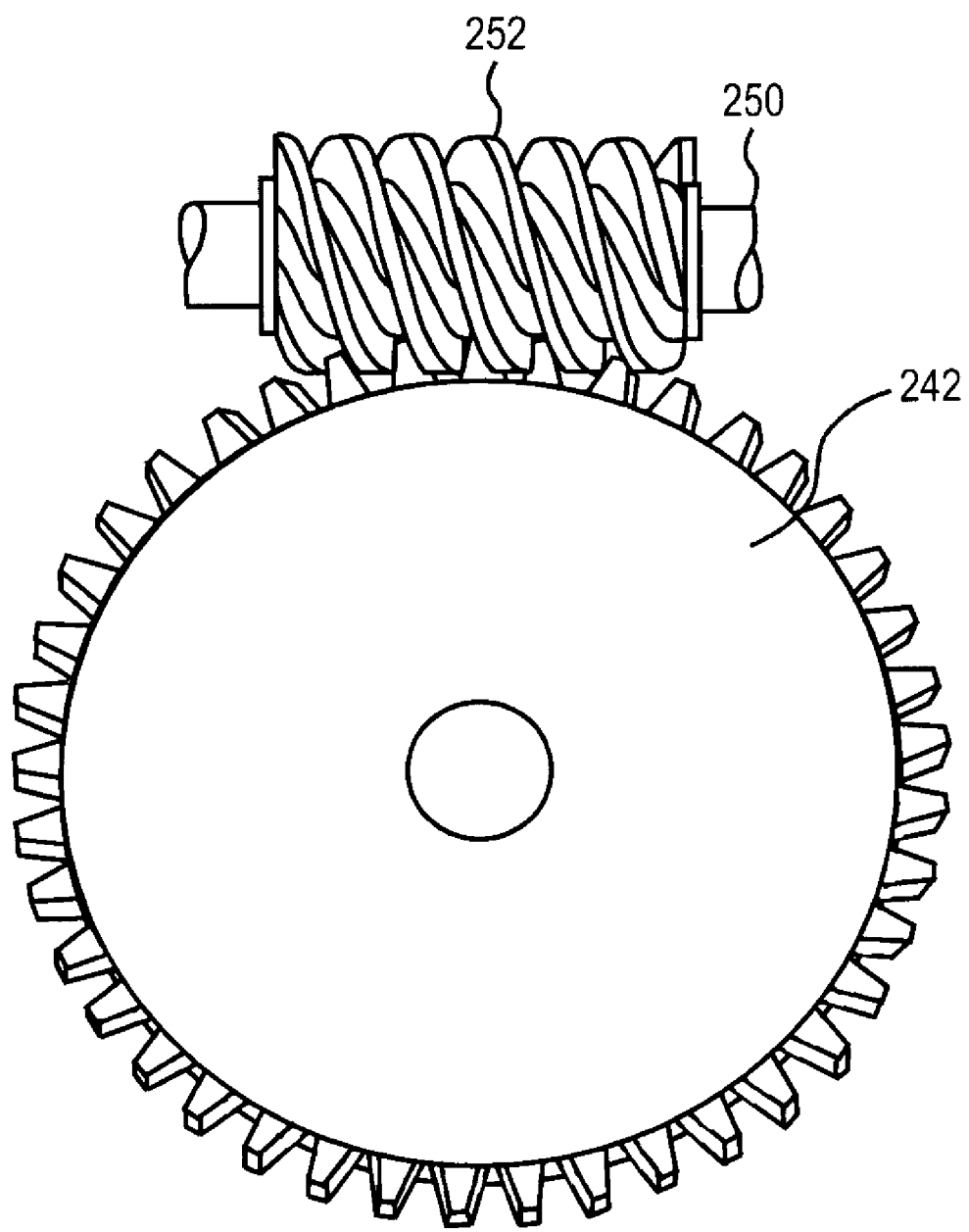
FIG. 2B is a side view of a worm gear drive disposed in certain embodiments within the spatial light modulator of FIG. 2A.

Referring now to FIGS. 2A, 2B, and 3, reflective spatial light modulator 110 further comprises position-error-servo ("PES") 240. As those skilled in the art will appreciate, a servo comprises a device comprising an output shaft, such as rotatable shaft 250. Rotatable shaft 250 can be positioned to specific angular positions by sending PES 240 a pre-defined coded signal. As long as that coded signal exists on input line 260, PES 240 will maintain the associated angular position of shaft 250. As the coded signal changes, the angular position of the shaft 250 changes. Referring now to FIG. 2B, in certain embodiments PES 240 comprises a rotatable worm wheel 242, and shaft 250 comprises a spirally-threaded portion 252, wherein spiral-threaded portion 252 meshes with worm wheel 242 for precise angular movement of worm wheel 242.

In the illustrated embodiment of FIGS. 2A and 3, PES 240 is interconnected by rotatable shaft 250 with rear portion 224 of display screen element 120 (FIGS. 1A, 2A, 3) of reflective spatial light modulator 110 (FIGS. 1A, 2A, 3). PES 240 can cause reflective display screen 120 to rotate around the Z axis of FIG. 1A in a first direction, or to rotate in a second and opposite direction, by causing rotatable shaft 250 to rotate in the first direction or in the second direction.

Figure 7:
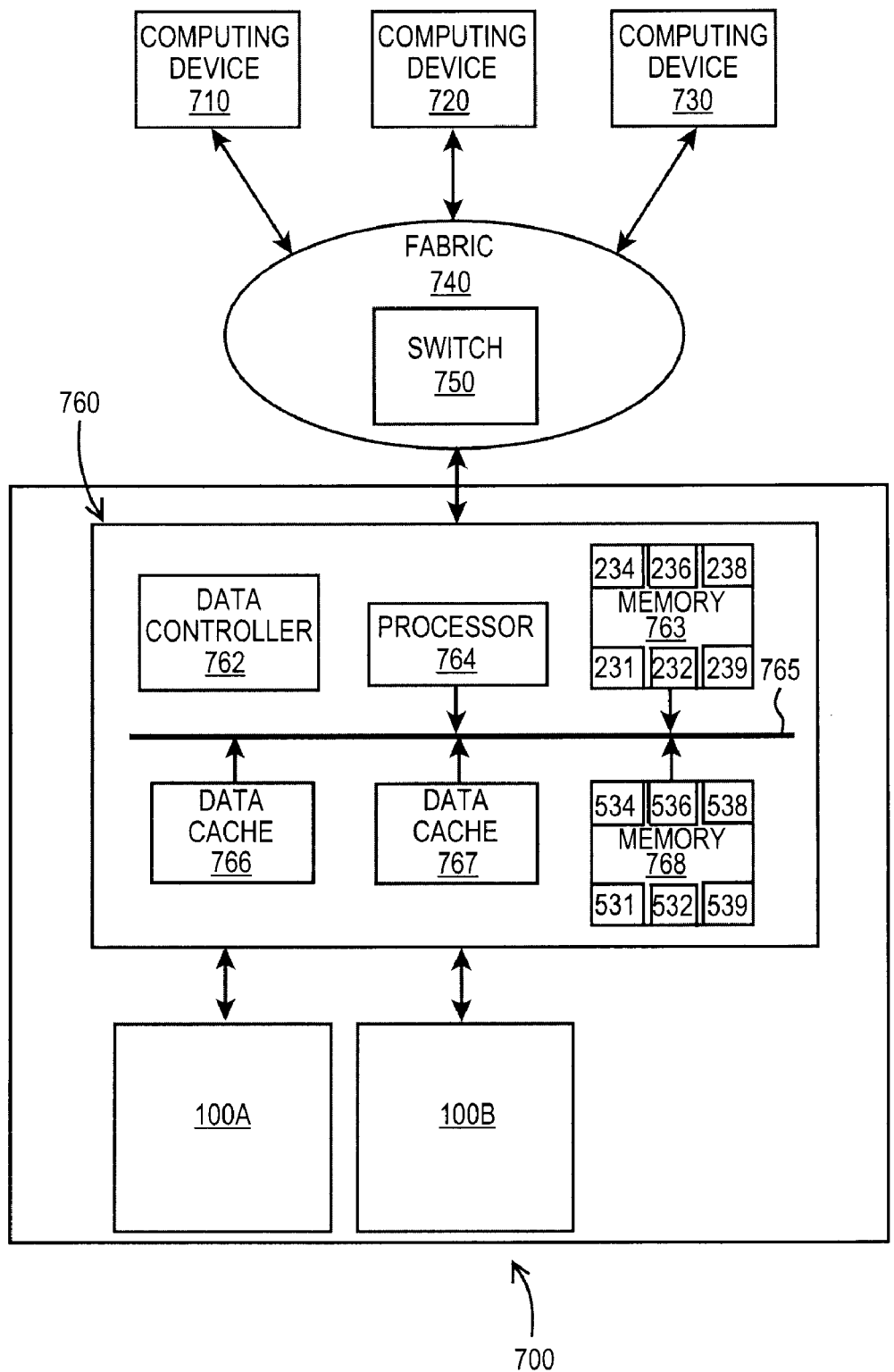
FIG. 7 is a block diagram showing Applicants' storage controller shown in communication with a plurality of computing devices and in communication with a plurality of holographic data storage systems.

In certain embodiments, reflective spatial light modulator 110 further comprises a floor stand 280 and vertical pillar 270, wherein PES 240 is attached to vertical pillar 270. In the illustrated embodiment of FIG. 3, communication link 310 interconnects PES 240 with an external controller, such as storage controller 760 (FIG. 7).

Figure 5A:
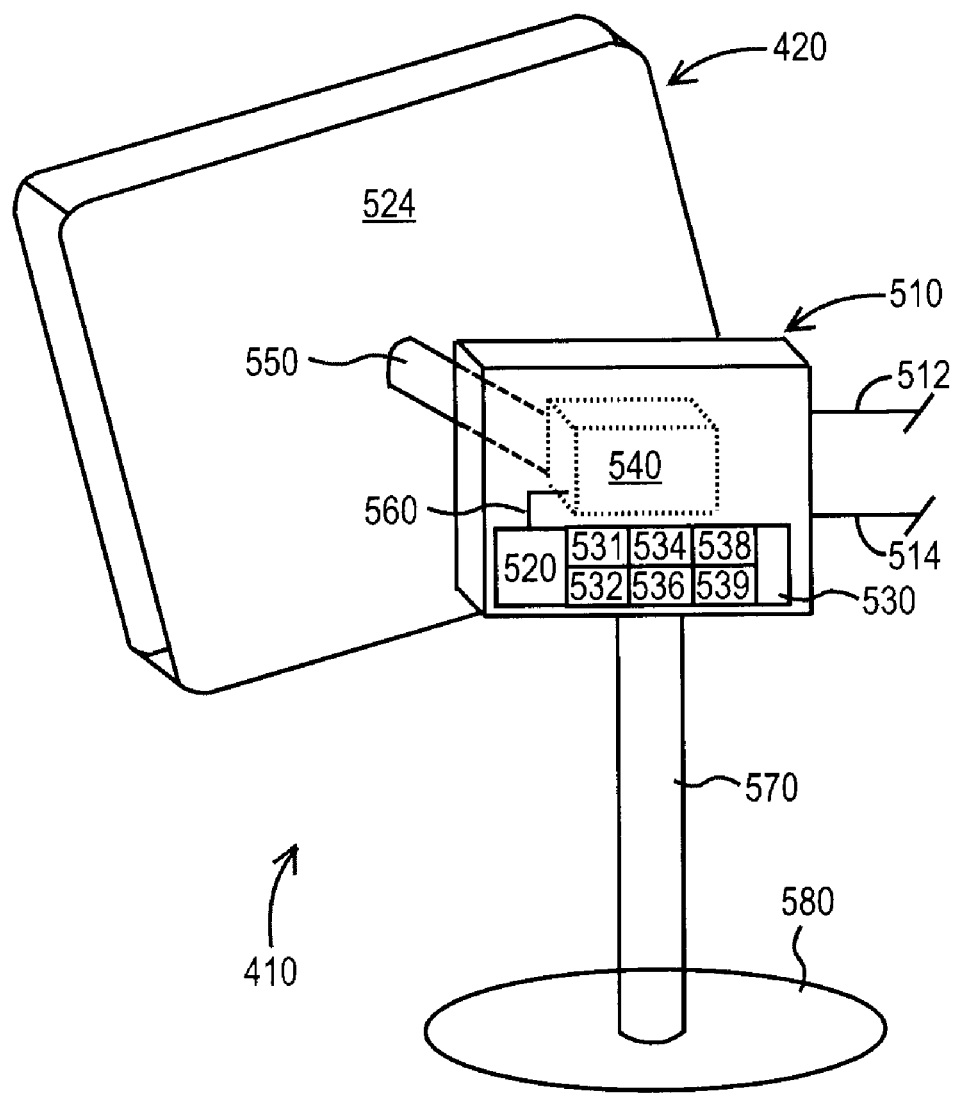
FIG. 5A is a perspective view of a portion of one embodiment of Applicants' optical detector.

In the illustrated embodiment of FIG. 2A, reflective spatial light modulator 110 further comprises SLM controller 210. In certain embodiments, SLM controller 210 is interconnected with optical detector controller 510 via communication link 212 which connects to communication link 512 (FIG. 5A). In certain embodiments, SLM controller 210 is interconnected with storage controller 760 (FIG. 7) via communication link 214 connecting to data bus 765.

In the illustrated embodiment of FIG. 2A, SLM controller 210 further comprises processor 220 and memory 230. In certain embodiments, memory 230 comprises non-volatile memory, such as and without limitation, battery backed-up RAM, a magnetic disk in combination with the associated software, firmware, and hardware, to read information from, and write information to, that magnetic disk, an optical disk in combination with the associated software, firmware, and hardware, to read information from, and write information to, that optical disk, an electronic storage medium, and the like. By "electronic storage medium," Applicants mean, for example, a device such as a PROM, EPROM, EEPROM, Flash PROM, compactflash, smartmedia, and the like.

In the illustrated embodiment of FIG. 2A, stored write reference orientation image 231 (FIGS. 2A, 7), instructions 232 (FIGS. 2A, 7), first matched filter 234 (FIGS. 2A, 7), second matched filter 236 (FIGS. 2A, 7), and third matched filter 238 (FIGS. 2A, 7), and write threshold correlation factor 239 (FIGS. 2A, 7), are written to memory 230. Processor 220 utilizes instructions 232 to operate SLM 210.

Figure 4A:
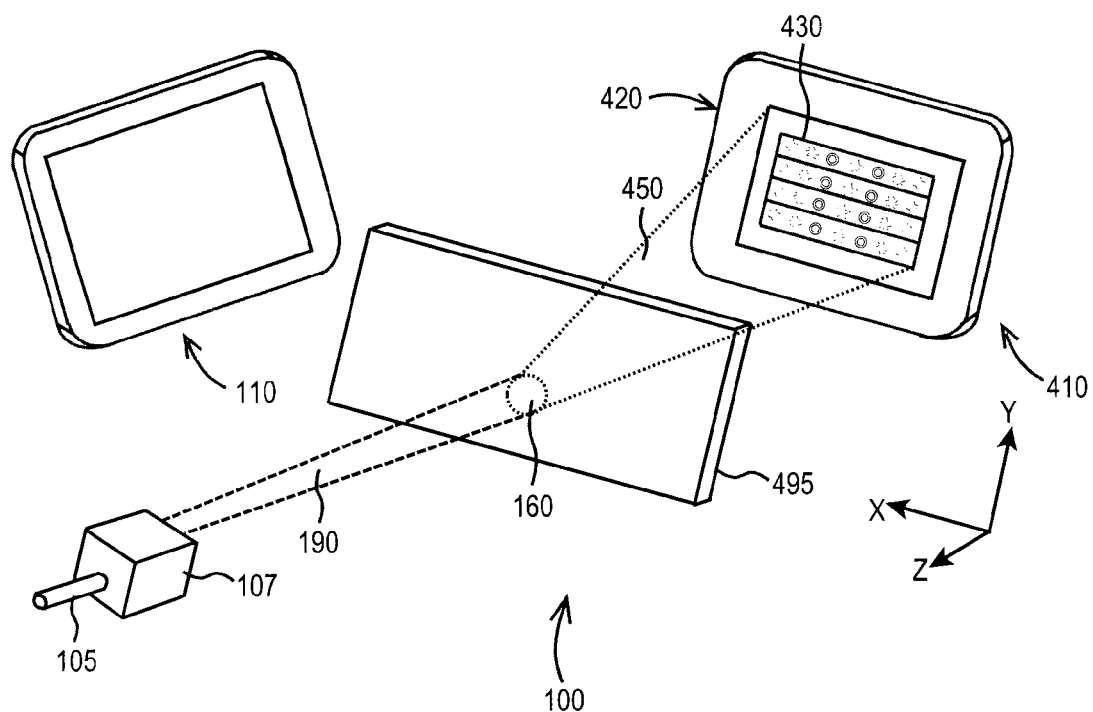
FIG. 4A shows Applicants' holographic data storage system projecting a write channel alignment data beam onto Applicants' optical detector.
Figure 4B:
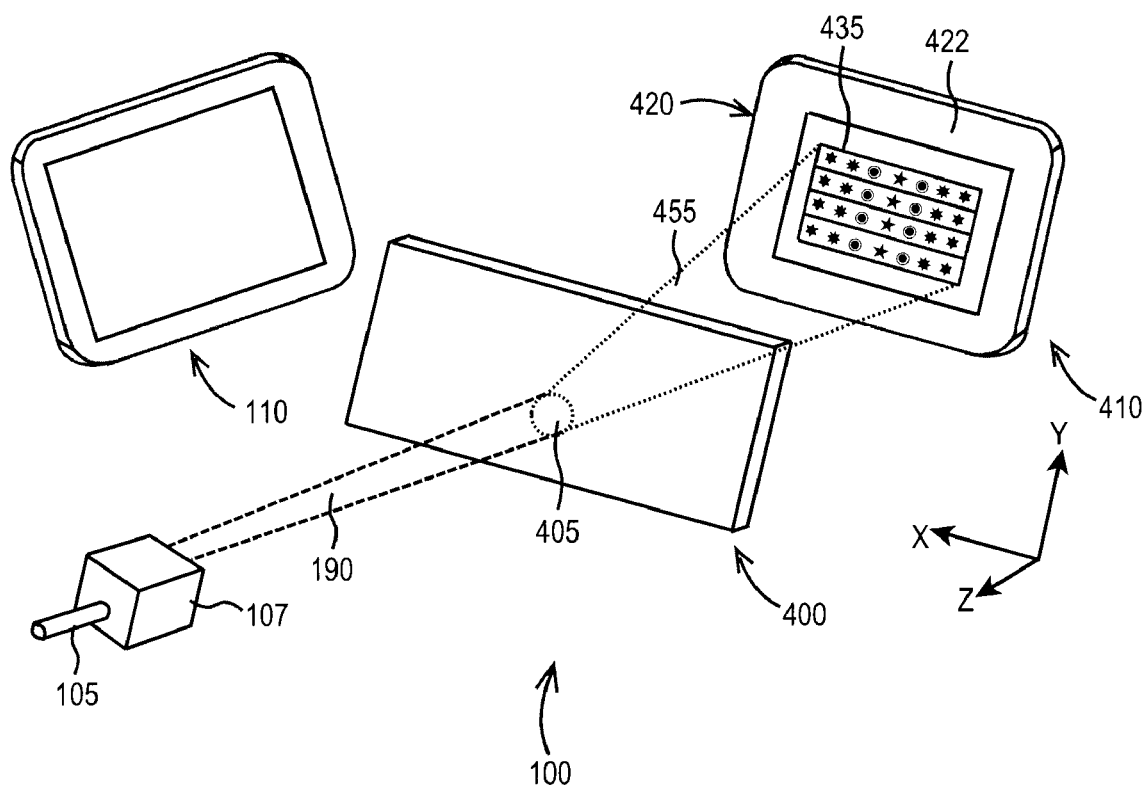
FIG. 4B shows Applicants' holographic data storage system projecting a read channel alignment data beam onto Applicants optical detector.

Referring now to FIGS. 4A and 4B, FIG. 4A shows reference beam 190 directed toward encoded holographic storage medium 495 such that reference beam 190 is diffracted by the interference pattern 160 (FIG. 1B) to form write alignment reference data beam 450 which comprises write reference orientation image 430. Image 430 is projected onto the input screen 420 of optical detector 410 (FIGS. 1A, 4A, 4B, 5A, 6). FIG. 4B shows reference beam 190 directed toward encoded holographic storage medium 400 such that reference beam 190 is diffracted by the interference pattern 405 to form read alignment reference data beam 455 which comprises read reference orientation image 435. Image 435 is projected onto the input screen 420 of optical detector 410 (FIGS. 1A, 4A, 4B, 5A, 6).

Figure 5B:
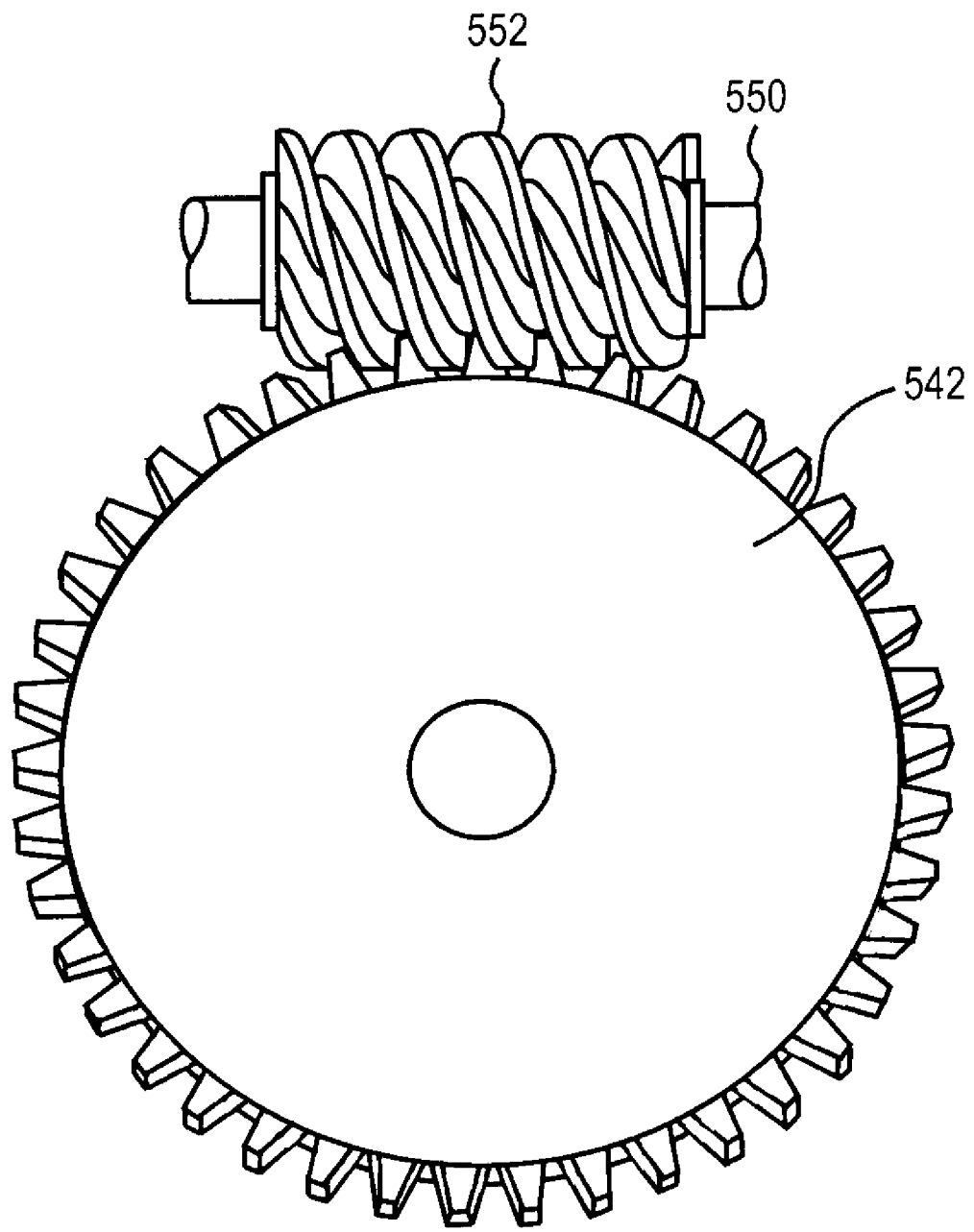
FIG. 5B is a side view of a worm gear drive disposed in certain embodiments within the optical detector of FIG. 5A.
Figure 6:
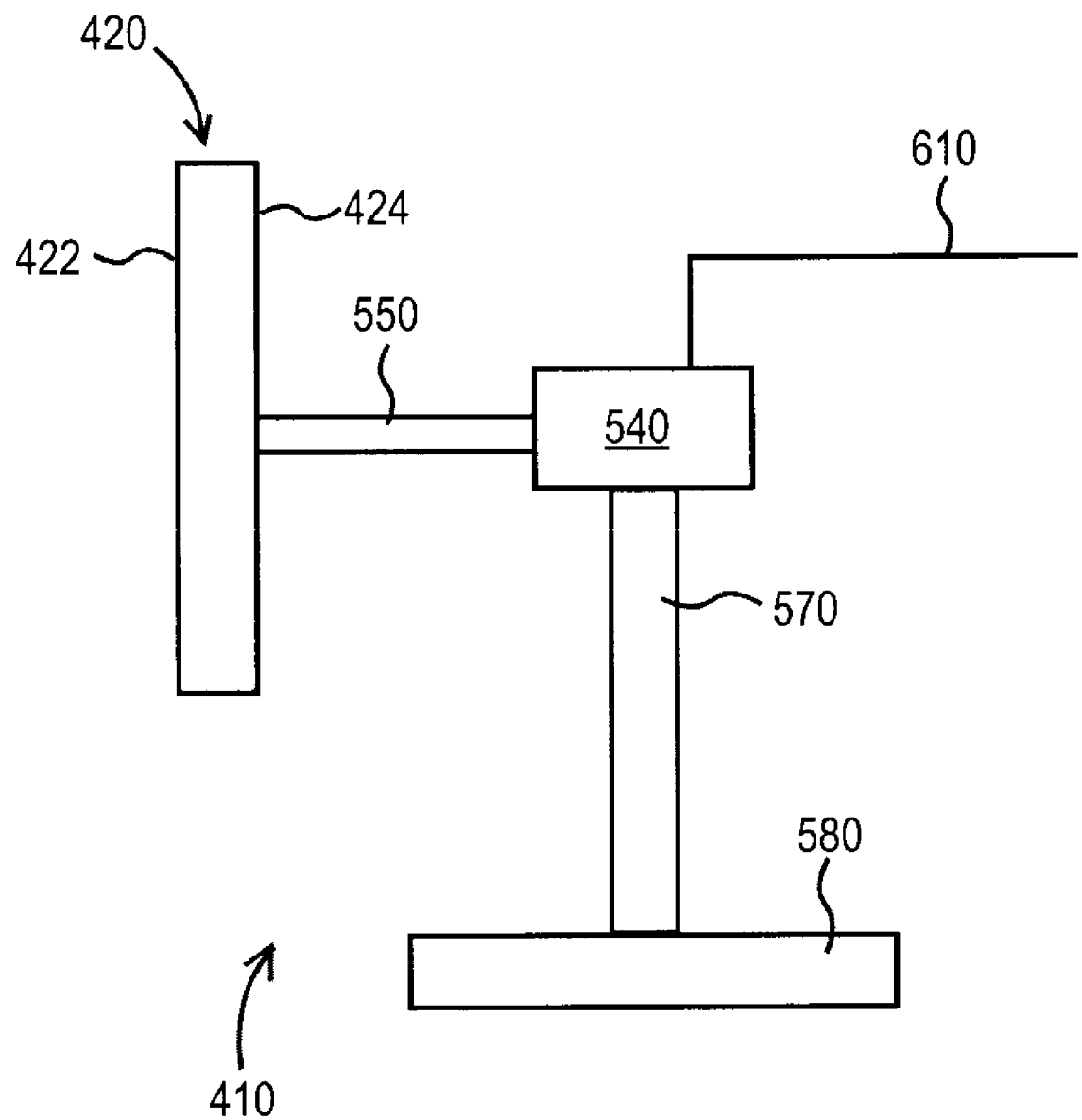
FIG. 6 is a side view of a second embodiment of Applicants' optical detector.

Referring now to FIGS. 5A, 5B, and 6, optical detector 410 (FIGS. 1A, 4A, 4B, 5A, 6) further comprises rotation-error-servo ("RES") 540. Rotatable shaft 550 can be positioned to a specific angular positions by sending RES 540 a pre-defined coded signal. As long as that coded signal exists on input line 560 or input line 610, RES 540 will maintain the associated angular position of shaft 550. As the coded signal changes, the angular position of the shaft 850 changes. Referring now to FIG. 5B, in certain embodiments RES 540 comprises a rotatable worm wheel 542, and shaft 550 comprises a spirally-threaded portion 552, wherein spiral-threaded portion 552 meshes with worm wheel 542.

In the illustrated embodiment of FIGS. 5A and 6, RES 540 is interconnected with rear portion 524 of display screen 420 by rotatable shaft 550. RES 540 can cause input screen 520 of optical detector 410 (FIGS. 1A, 4A, 4B, 5A, 6) to rotate around the Z axis of FIGS. 4A and 4B in a first direction, or to rotate in a second and opposite direction, by causing rotatable shaft 550 to rotate in the first direction or in the second direction.

In certain embodiments, optical detector 410 (FIGS. 1A, 4A, 4B, 5A, 6) further comprises a floor stand 580 and vertical pillar 570. In the illustrated embodiment of FIG. 6, signal input line 610 interconnects RES 540 with an external controller, such as storage controller 760 (FIG. 7) via data bus 765.

In the illustrated embodiment of FIG. 5A, optical detector 410 (FIGS. 1A, 4A, 4B, 5A, 6) further comprises optical detector controller 510. In certain embodiments, optical detector controller 410 is interconnected with SLM controller 210 (FIG. 2A) via communication links 212 (FIG. 2A) and 512. In certain embodiments, optical detector controller 510 is interconnected with storage controller 760 (FIG. 7) via communication link 514 connecting to data bus 765.

In the illustrated embodiment of FIG. 5A, detector controller 410 further comprises processor 520 and memory 530. In certain embodiments, memory 530 comprises non-volatile memory, such as and without limitation, battery backed-up RAM, a magnetic disk in combination with the associated software, firmware, and hardware, to read information from, and write information to, that magnetic disk, an optical disk in combination with the associated software, firmware, and hardware, to read information from, and write information to, that optical disk, an electronic storage medium, and the like. By "electronic storage medium," Applicants mean, for example, a device such as a PROM, EPROM, EEPROM, Flash PROM, compactflash, smartmedia, and the like.

In the illustrated embodiment of FIG. 5A, detector controller 510 further comprises processor 520 and memory 530, wherein read reference orientation image 531, instructions 532, first matched filter 534, second matched filter 536, and third matched filter 538, and read threshold correlation factor 539, are written to memory 530. Processor 520 utilizes instructions 532 to operate optical detector 410 (FIGS. 1A, 4A, 4B, 5A, 6).

FIG. 7 illustrates one embodiment of Applicants' holographic data storage and retrieval system 700. In the illustrated embodiment of FIG. 7, holographic data storage and retrieval system 700 communicates with computing devices 710, 720, and 730. In the illustrated embodiment of FIG. 7, computing devices 710, 720, and 730 communicate with storage controller 760 through a data communication fabric 740. In certain embodiments, fabric 740 comprises one or more data switches 750. Further in the illustrated embodiment of FIG. 7, storage controller 760 communicates with one or more holographic encoding/decoding systems. In the illustrated embodiment of FIG. 7, holographic data storage and retrieval system 700 comprises a first holographic encoding/decoding system 100 (FIGS. 1A, 1B, 4A, 4B), shown as system 10A, and a second holographic encoding/decoding system 100, shown as system 100B.

In certain embodiments, computing devices 710, 720, and 730, are selected from the group consisting of an application server, a web server, a work station, a host computer, or other like device from which information is likely to originate. In certain embodiments, one or more of computing devices 710, 720, and/or 730 are interconnected with fabric 740 using Small Computer Systems Interface ("SCSI") protocol running over a Fibre Channel ("FC") physical layer. In other embodiments, the connections between computing devices 710, 720, and 730, comprise other protocols, such as Infiniband, Ethernet, or Internet SCSI ("iSCSI"). In certain embodiments, switches 750 are configured to route traffic from the computing devices 710, 720, and/or 730, directly to the storage controller 760.

In the illustrated embodiment of FIG. 7, storage controller 760 comprises a data controller 762, memory 763, memory 768, processor 764, and data caches 766 and 767, wherein these components communicate through a data bus 765. In certain embodiments, memory 763 comprises a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like. In certain embodiments, memory 768 comprises a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

In certain embodiments, the storage controller 760 is configured to read data signals from and write data signals to a serial data bus on one or more of the computing devices 710, 720, and/or 730. Alternatively, in other embodiments the storage controller 760 is configured to read data signals from and write data signals to one or more of the computing devices 710, 720, and/or 730, through the data bus 765 and the fabric 740.

In certain embodiments, storage controller 760 converts a serial data stream into a convolution encoded data images. Those data images are transferred to an RSLM 110 (FIGS. 1A, 2A, 3, 4A, 4B) disposed in one or more of holographic encoding/decoding systems 100A and/or 100B.

In certain embodiments, holographic encoding/decoding systems 100A and 100B are located in different geographical places. In certain embodiments, storage controller 760 distributes information between two or more holographic encoding/decoding systems in order to protect the information.

Applicants' invention comprises an apparatus and method to align a holographic read channel prior to decoding information encoded in a holographic data storage medium. In certain embodiments by "align a holographic read channel," Applicants mean to position the display screen portion 120

(FIGS. 1A, 2A, 3, 4) of Applicants' reflective spatial light modulator 110 (FIGS. 1A, 2A, 3, 4).

Applicants' method further comprises an apparatus and method to align a holographic write channel prior to encoding information in a holographic data storage medium. In certain embodiments by "align a holographic write channel," Applicants mean to position the input screen portion 420 (FIGS. 4A, 4A, 5, 6) of Applicants' optical detector 410 (FIGS. 1A, 4A, 4B, 5A, 6).

Figure 15:
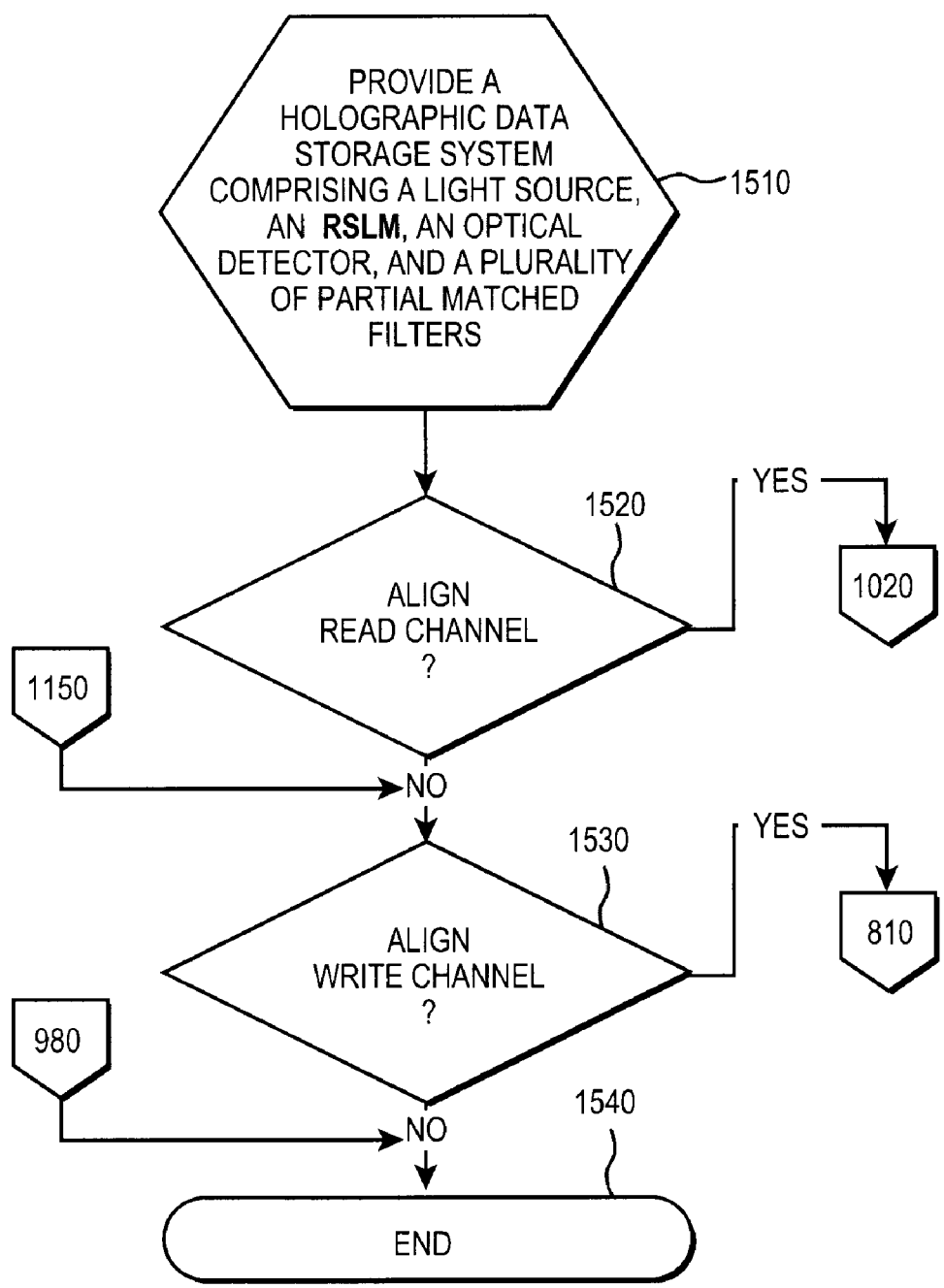
FIG. 15 is a flow chart summarizing the steps of Applicants' method.

Referring now to FIG. 15, in step 1510 Applicants' method provides a holographic data storage system, such as for example Applicants' holographic data storage system 100 (FIGS. 1A, 1B, 4A, 4B), comprising a light source, a spatial light modulator, an optical detector, and a plurality of matched filters. In certain embodiments, Applicants' holographic data storage system comprises a storage controller, such as and without limitation, storage controller 760 (FIG. 7).

In step 1520 Applicants' method determines whether to align a holographic read channel prior to decoding information encoded in a holographic data storage medium. If Applicants' method elects in step 1520 not to align the holographic read channel, then the method transitions from step 1520 to step 1530 and continues as described hereinbelow. If Applicants' method elects to align the holographic read channel portion of the holographic data storage system of step 1510, then the method transitions from step 1520 to step 1010 (FIG. 10).

Figure 10:
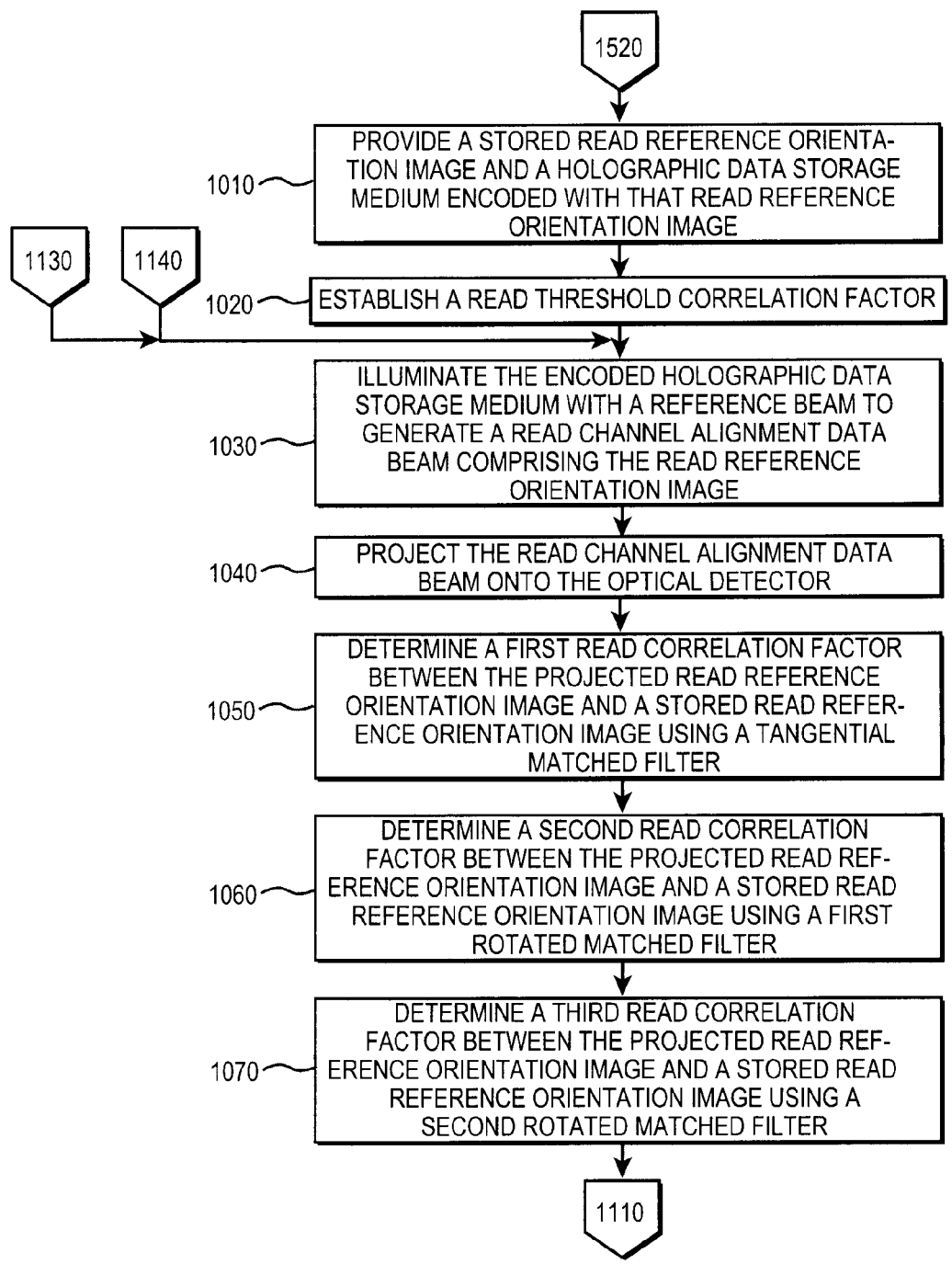
FIG. 10 is a flow chart summarizing the initial steps of Applicants' method to align Applicants' optical detector.

Referring now to FIG. 10, in step 1010 Applicants' method provides an encoded holographic data storage medium, such as encoded holographic data storage medium 400 (FIG. 4B) comprising an encoded read reference orientation image, such as encoded read reference orientation image 405 (FIG. 4B). In certain embodiments, encoded read reference orientation image 405 is integrally formed in encoded holographic data storage medium 400. In other embodiments, read reference orientation image 405 is encoded in holographic data storage medium 400 using a precision holographic data recording apparatus operated by the manufacturer of holographic data storage medium 400.

In step 1020, Applicants' method establishes a read threshold correlation factor. In certain embodiments, the read threshold correlation factor of step 1020 is set by the owner and/or operator of the holographic data storage system of step 1510. In certain embodiments, the read threshold correlation factor of step 1020 is set by one or more computing systems, such as one or more of computing systems 710 (FIG. 7), 720 (FIG. 7), and/or 730 (FIG. 7). In certain embodiments, the read threshold correlation factor of step 1510 is written to memory 530 (FIG. 5A) as write threshold correlation factor 539 (FIGS. 5A, 7). In certain embodiments, the read threshold correlation factor of step 1510 is written to memory 768 (FIG. 7) as write threshold correlation factor 539 (FIGS. 5A, 7).

In step 1030, Applicants' method illuminates the holographic data storage medium comprising encoded read reference orientation image, such as encoded read reference orientation image 405 (FIG. 4B), with a reference beam, such as reference beam 190 (FIGS. 1A, 4A, 4B), to generate a read channel alignment data beam, such as read channel alignment data beam 455 (FIG. 4B), wherein that read channel alignment data beam comprises a projected read reference orientation image, such as projected read reference orientation image 435 (FIG. 5A).

In step 1040, Applicants' method projects the read channel alignment data beam of step 1030 onto the optical detector of step 1510, such as optical detector 410 (FIGS. 1A, 1B, 4A, 4B, 5, 6), such that the projected read reference orientation image 435 is disposed on the input screen portion of the optical detector, such as input screen 420 (FIGS. 4A, 4B, 5, 6) of optical detector 410 (FIGS. 1A, 4A, 4B, 5, 6).

Figure 16:
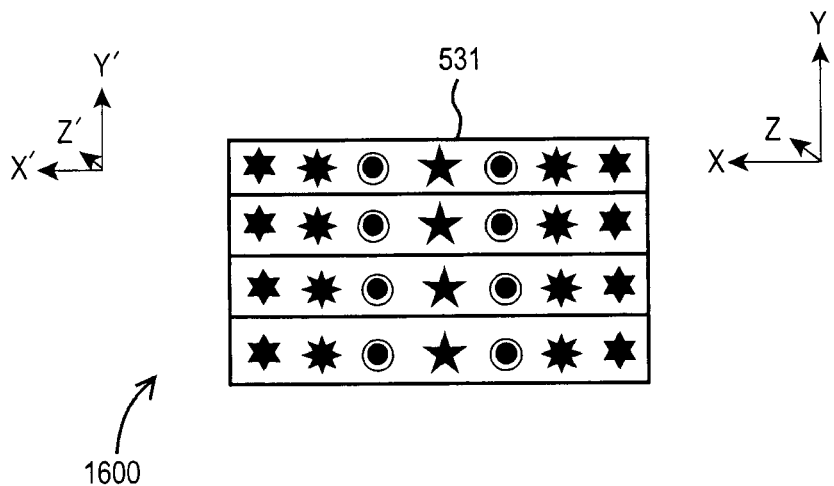
FIG. 16 shows one embodiment of Applicants' read reference orientation image as seen through a tangential matched filter.

In step 1050, Applicants' method determines a first read correlation factor using the read reference orientation image projected onto the optical detector in step 1030, a stored read reference write orientation image, such as stored read reference orientation image 531 (FIGS. 5A, 7), and a tangential matched filter, such as for example Applicants' first matched filter 534 (FIGS. 5A, 7). Referring now to FIG. 16, image 1600 comprises stored read reference orientation image 531 (FIGS. 5A, 7) as seen through Applicants' tangential matched filter 532 (FIGS. 5A, 7), wherein the X' axis of image is 1600 parallel to the X axis of optical detector 410 (FIGS. 1A, 4A, 4B, 5A, 6), and wherein the Y' axis of image 1600 is parallel to the Y axis of optical detector 410 (FIGS. 1A, 4A, 4B, 5A, 6), and wherein the Z' axis of image 1600 is parallel to the Z axis of optical detector 410 (FIGS. 1A, 4A, 4B, 5A, 6).

In certain embodiments, step 1050 is performed by a processor, such as processor 520 (FIG. 5A), disposed within Applicants' optical detector 410 (FIGS. 4A, 4B, 5, 6). In certain embodiments, step 1050 is performed by a processor, such as processor 764 (FIG. 7), disposed within Applicants' storage controller 760 (FIG. 7).

In certain embodiments, in step 1050 Applicants' method calculates the difference between the projected read orientation image g(x,y) and impulse response h(x,y)=s*(−x,−y) of the image 1600 (FIG. 16). Referring now to Equation (1), V(x,y) comprises the cross-correlation between the projected read orientation image 1400 and s(x,y) for image 1600. As those skilled in the art will appreciate, Equation (1) comprises a double integral, meaning that the integration is over the X axis and Y axis directions of the input screen portion of the optical detector. Additionally, ξ is the integration variable along that X axis, η is the integration variable along that Y axis, and * denotes a complex conjugate.

$$V(x,y)=\iint g(\xi,\eta)s^*(\xi-x,\eta-y)d\xi d\eta \quad (1)$$

Mathematically, V(x,y) comprises a surface varying along the X axis and the Y axis, for each (x,y). There is one value of V(x,y) for each detector element in detector 510. In certain embodiments, the range V(x,y) for each (x,y) is between −1 and +1, wherein +1 represents the ideal correlation of one hundred (100%). To maximize V(x,y), the following difference surface, Difference (x,y), is defined in Equation (2).

$$\text{Difference}(x,y)=1-V(x,y) \quad (2)$$

Difference(x,y) is calculated by subtracting the matched filter correlation V(x,y) from unity. In certain embodiments, Difference(x,y) is evaluated (a) point-to-point. In certain embodiments, Difference(x,y) is evaluated as an arithmetic mean. In certain embodiments, Difference(x,y) is evaluated as a geometric mean. In certain embodiments, Difference(x,y) is evaluated as a root-mean-square. In certain embodiments, Difference(x,y) ranges between 0 and +2, wherein the ideal difference for each value of (x,y) is 0, meaning for a value of 0 that there is no difference between the projected orientation image and the reference orientation image at that point (x,y).

In certain embodiments, Difference(x,y) is evaluated point-by-point. In other embodiments, Applicants have found it advantageous to quantify surface Difference(x,y) in terms of a single number, i.e. a correlation factor. In certain embodiments, the first read correlation factor of step 1050, and/or the second read correlation factor of step 1060, and/or the third read correlation factor of step 1070, comprises a MAX_Difference which is equal to the maximum value of Difference (x,y). In other embodiments, the first read correlation factor of step 1050, and/or the second read correlation factor of step 1060, and/or the third read correlation factor of step 1070, comprises an AM_Difference comprising the arithmetic mean of the values of Difference(x,y). In still other embodiments, the first read correlation factor of step 1050, and/or the second read correlation factor of step 1060, and/or the third read correlation factor of step 1070, comprises a GM_Difference comprising the geometric mean of the values of Difference(x,y). In yet other embodiments, the first read correlation factor of step 1050, and/or the second read correlation factor of step 1060, and/or the third read correlation factor of step 1070, comprises an RMS_Difference comprising the root-mean-square of the values of Difference(x,y).

Figure 17:
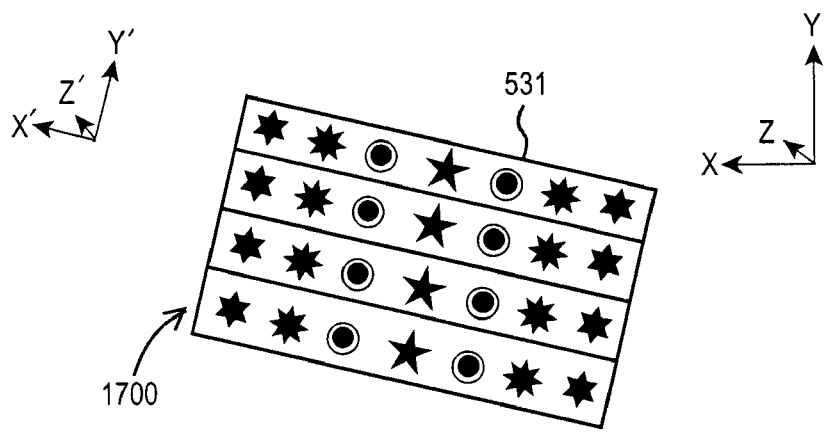
FIG. 17 shows one embodiment of Applicants' read reference orientation image as seen through a first rotated matched filter.

In step 1060, Applicants' method determines a second read correlation factor using the reference orientation image projected onto the optical detector in step 1040 (FIG. 10), the stored reference orientation image 531 (FIGS. 5A, 7), and a first rotated matched filter, such as Applicants' second matched filter 536 (FIGS. 5A, 7). Referring now to FIG. 17, image 1700 comprises reference image 531 as seen through Applicants' first rotated matched filter, wherein neither the X' axis nor the Y' axis of image 1700 is parallel to the X axis of the optical detector, but wherein the Z' axis of image 1700 is parallel to the Z axis of the optical detector.

The X' axis of image 1700 is rotated in a first direction from the X axis of optical detector about the Z axis. In certain embodiments, the X' axis of image 1700 is rotated about the Z axis an increment of up to about one degree in a first direction from the X axis of optical detector. In certain embodiments, the second read correlation factor of step 1060 is calculated using Equations (1) and (2) as described hereinabove.

In certain embodiments, step 1060 is performed by a processor, such as processor 520 (FIG. 5A), disposed within Applicants' optical detector 410 (FIGS. 1A, 4A, 4B, 5A, 6). In certain embodiments, step 1060 is performed by a processor, such as processor 764 (FIG. 7), disposed within Applicants' storage controller 760 (FIG. 7).

Figure 18:
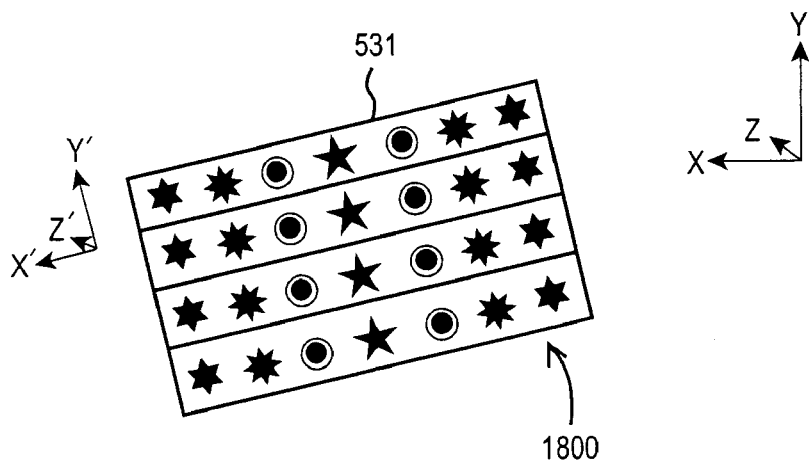
FIG. 18 shows one embodiment of Applicants' read reference orientation image as seen through a second rotated matched filter.

In step 1070, Applicants' method determines a third read correlation factor using the read reference orientation image projected onto the optical detector in step 1040 (FIG. 10), the stored reference orientation image 531 (FIGS. 5A, 7), and a second rotated matched filter, such as Applicants' third matched filter 538 (FIGS. 5A, 7). Referring now to FIG. 18, image 1800 comprises reference image 531 as seen through Applicants' second rotated matched filter, wherein neither the X' axis nor the Y' axis of image 1800 is parallel to the X axis of the optical detector, but wherein the Z' axis of image 1800 is parallel to the Z axis of the optical detector.

The X axis of the image 1800 is rotated in a second direction from the X axis of optical detector about the Z axis. In certain embodiments, the X' axis of image 1800 is rotated about the Z axis an increment of up to about one degree in the second direction from the X axis of optical detector. In certain embodiments, the third read correlation factor of step 1070 is calculated using Equations (1) and (2) as described hereinabove.

In certain embodiments, step 1070 is performed by a processor, such as processor 520 (FIG. 5A), disposed within Applicants' optical detector 410 (FIGS. 1A, 4A, 4B, 5A, 6). In certain embodiments, step 1070 is performed by a processor, such as processor 764 (FIG. 7), disposed within Applicants' storage controller 760 (FIG. 7).

Applicants' method transitions from step 1070 to step 1110 (FIG. 11) wherein Applicants' method determines if the first read correlation factor of step 1050 is greater than or equal to the read threshold correlation factor of step 1020 (FIG. 10). In certain embodiments, step 1110 is performed by a processor, such as processor 520 (FIG. 5A), disposed within Applicants' optical detector 510 (FIGS. 4A, 4B, 5A, 6). In certain embodiments, step 1110 is performed by a processor, such as processor 764 (FIG. 7), disposed within Applicants' storage controller 760 (FIG. 7).

If Applicants' method determines in step 1110 that the first read correlation factor of step 1050 is not greater than or equal to the read threshold correlation factor of step 1020, then the method transitions from step 1110 to step 1120 wherein the method determines if the second read correlation factor of step 1060 (FIG. 10) is greater than the third read correlation factor of step 1070 (FIG. 10). In certain embodiments, step 1120 is performed by a processor, such as processor 520 (FIG. 5A), disposed within Applicants' optical detector 410 (FIGS. 1A, 4A, 4B, 5A, 6). In certain embodiments, step 1120 is performed by a processor, such as processor 764 (FIG. 7), disposed within Applicants' storage controller 760 (FIG. 7).

If Applicants' method determines in step 1120 that the second read correlation factor of step 1060 is greater than the third read correlation factor of step 1070, then the method transitions from step 1120 to step 1130 wherein the method rotates the input screen portion 420 (FIGS. 1B, 4A, 4B, 5A, 6) of Applicants' optical detector 410 (FIGS. 1A, 4A, 4B, 5A, 6) about the Z axis in the first direction. In certain embodiments, Applicants' method rotates the input screen 420 about the Z axis an increment of up to about two degrees (2°). Applicants' method transitions from step 1130 to step 1030 (FIG. 10) and continues as described herein.

In certain embodiments, in step 1130 a processor, such as processor 520 (FIG. 5A), disposed within Applicants' optical detector, such as optical detector 410 (FIGS. 1A, 4A, 4B, 5A, 6), causes a servo comprising a shaft extending outwardly therefrom and attached to the input screen element of Applicants' optical detector, such as RES 540 (FIGS. 5A, 6) and rotatable shaft 550 (FIGS. 5A, 6), disposed in Applicants' optical detector to rotate up to about two degrees in the first direction. In certain embodiments, in step 1130 a processor, such as processor 764 (FIG. 7), disposed within Applicants' storage controller, such as storage controller 700 (FIG. 7), causes a servo comprising a shaft extending outwardly therefrom and attached to the input screen element of Applicants' optical detector, such as RES 540 (FIGS. 5A, 6) and rotatable shaft 550 (FIGS. 5A, 6), disposed in Applicants' optical detector 410 (FIGS. 1A, 4A, 4B, 5A, 6) to rotate up to about two degrees in the first direction.

If Applicants' method determines in step 1120 that the second read correlation factor of step 1060 (FIG. 10) is not greater than the third read correlation factor of step 1070 (FIG. 10), then the method transitions from step 1120 to step 1140 wherein the method rotates the input screen element of Applicants' optical detector about the Z axis in the second direction. In certain embodiments, in step 1140 Applicants' method rotates the input screen about the Z axis in the second direction an increment of about two degrees (2°). Applicants' method transition from step 1140 to step 1030 and continues as described herein.

In certain embodiments, in step 1140 a processor, such as processor 520 (FIG. 5A), disposed within Applicants' optical detector, such as optical detector 410 (FIGS. 1A, 4A, 4B, 5A, 6), causes a servo comprising a shaft extending outwardly therefrom and attached to the input screen element of Applicants' optical detector, such as RES 540 (FIGS. 5A, 6) and rotatable shaft 550 (FIGS. 5A, 6), disposed in Applicants' optical detector to rotate up to about two degrees in the second direction. In certain embodiments, in step 1140 a processor, such as processor 764 (FIG. 7), disposed within Applicants' storage controller, such as storage controller 700 (FIG. 7), causes a servo comprising a shaft extending outwardly therefrom and attached to the input screen element of Applicants' optical detector, such as RES 540 (FIGS. 5A, 6) and rotatable shaft 550 (FIGS. 5A, 6), disposed in Applicants' optical detector 410 (FIGS. 1A, 4A, 4B, 5A, 6) to rotate up to about two degrees in the second direction.

Figure 13:
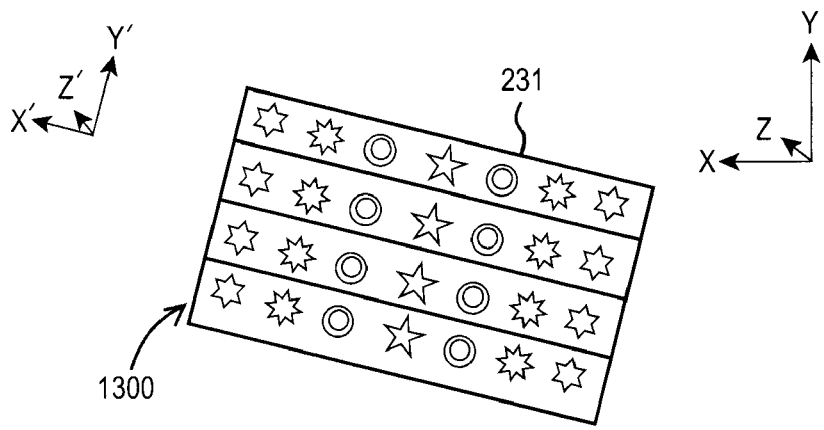
FIG. 13 shows one embodiment of Applicants write reference orientation image as seen through a first rotated matched filter.

If Applicants' method determines in step 1110 that the first read correlation factor of step 1050 is greater than or equal to the read threshold correlation factor of step 1020, then the method transitions from step 1110 to step 1150 wherein the method determines that the holographic read channel portion of the holographic data storage system of step 1510 (FIG. 15) is aligned. In certain embodiments, step 1150 further comprises placing the holographic data storage system of step 1510 in an encode information status. Applicants' method transitions from step 1150 to step 1530 (FIG. 13).

Referring once again to FIG. 15, in 1530 Applicants' method determines whether to align the holographic write channel portion of the holographic data storage system of step 1510. If Applicants' method elects in step 1530 to align the holographic write channel portion of the holographic data storage system of step 1510, then the method transitions from step 1530 to step 1540 and ends. Alternatively, if Applicants' method elects in step 1530 to align the holographic write channel portion of the holographic data storage system of step 1510, then the method transitions from step 1530 to step 810.

Figure 8:
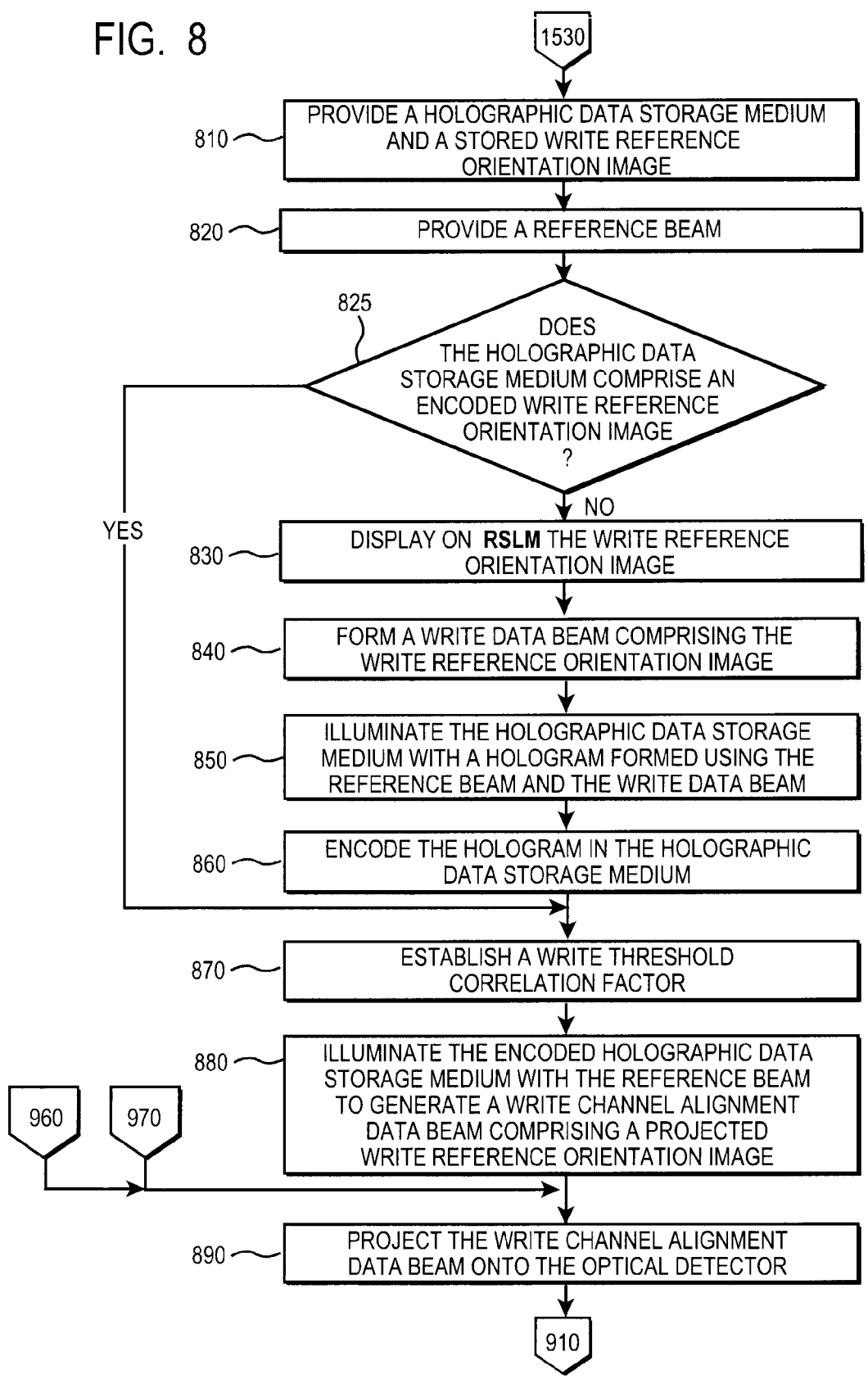
FIG. 8 is a flow chart summarizing the initial steps of Applicants' method to align Applicants' spatial light modulator.

Referring now to FIG. 8, in step 810 Applicants' method provides a holographic data storage medium and a stored write reference orientation image, such as write reference orientation image 231 (FIGS. 2A, 7, 12, 13, 14). In certain embodiments, Applicants' write reference orientation of step 810 differs from Applicants' read reference orientation image of step 1010. For example, Applicants' write reference orientation image 231 (FIGS. 2A, 7, 12, 13, 14) differs from Applicants' read reference orientation image 531 (FIGS. 5A, 7, 16, 17, 18). In other embodiments, the write orientation image of step 810 is the same as the read orientation image of step 1010 (FIG. 10). In step 820, Applicants' method provides a reference beam, such as reference beam 190 (FIGS. 1A, 1B, 4A, 4B).

In step 825, Applicants' method determines if the holographic data storage medium of step 810 comprises an encoded write reference image. If Applicants' method determines that the holographic data storage medium does comprise an encoded write reference image, then the method transitions from step 825 to step 870. Alternatively, if the holographic data storage medium does not comprise an encoded write reference image, then the method transitions from step 825 to step 830 wherein Applicants' method displays on the reflective spatial light modulator of step 1510 (FIG. 15) an image, such as image 130 (FIG. 1A), of a stored write reference orientation image, such as stored write reference orientation image 231 (FIGS. 2A, 7).

In step 840, Applicants' method forms a write data beam comprising the write reference orientation image by reflecting a carrier beam, such as carrier beam 170 (FIGS. 1A, 2A), off the RSLM of step 830 such that the write data beam comprises the displayed write reference orientation image.

In step 850, Applicants' method illuminates the holographic data storage medium of step 805 with a hologram formed by the interaction of the write data beam of step 840 with the reference beam of step 820. In step 860, Applicants' method encodes the hologram of step 840 as an interference pattern within the holographic data storage medium of step 805.

In step 870, Applicants' method establishes a write threshold correlation factor. In certain embodiments, the write threshold correlation factor of step 870 is set by the owner and/or operator of the holographic data system of step 1510. In certain embodiments, the write threshold correlation factor of step 870 is set by one or more computing systems, such as one or more of computing systems 710 (FIG. 7), 720 (FIG. 7), and/or 730 (FIG. 7). In certain embodiments, the write threshold correlation factor of step 870 is written to memory 230 (FIG. 2A) as write threshold correlation factor 239 (FIGS. 2A, 7). In certain embodiments, the write threshold correlation factor of step 870 is written to memory 763 (FIG. 7) as write threshold correlation factor 239 (FIGS. 2A, 7).

In certain embodiments, the write threshold correlation factor of step 870 is the same as the read threshold correlation factor of step 1020 (FIG. 10). In other embodiments, the write threshold correlation factor of step 870 is not the same as the read threshold correlation factor of step 1020 (FIG. 10).

In step 880, Applicants' method illuminates the holographic data storage medium encoded with a write reference orientation image with a reference beam, such as reference beam 190 (FIGS. 1A, 1B, 4A, 4B), to generate a write channel alignment data beam, such as write channel alignment data beam 450 (FIG. 4A), wherein that write channel alignment data beam comprises a projected write reference orientation image, such as projected write reference orientation image 430 (FIG. 4A).

In step 890, Applicants' method projects the write channel alignment data beam of step 880 onto the optical detector of step 1510 (FIG. 15), such as optical detector 210 (FIGS. 1A, 4A, 4B, 5A, 6), such that the projected write reference orientation image 430 is disposed on the input screen portion of the optical detector, such as input screen 420 (FIGS. 4A, 4B, 5A, 6) of optical detector 410 (FIGS. 1A, 4A, 4B, 5A, 6).

Figure 9:
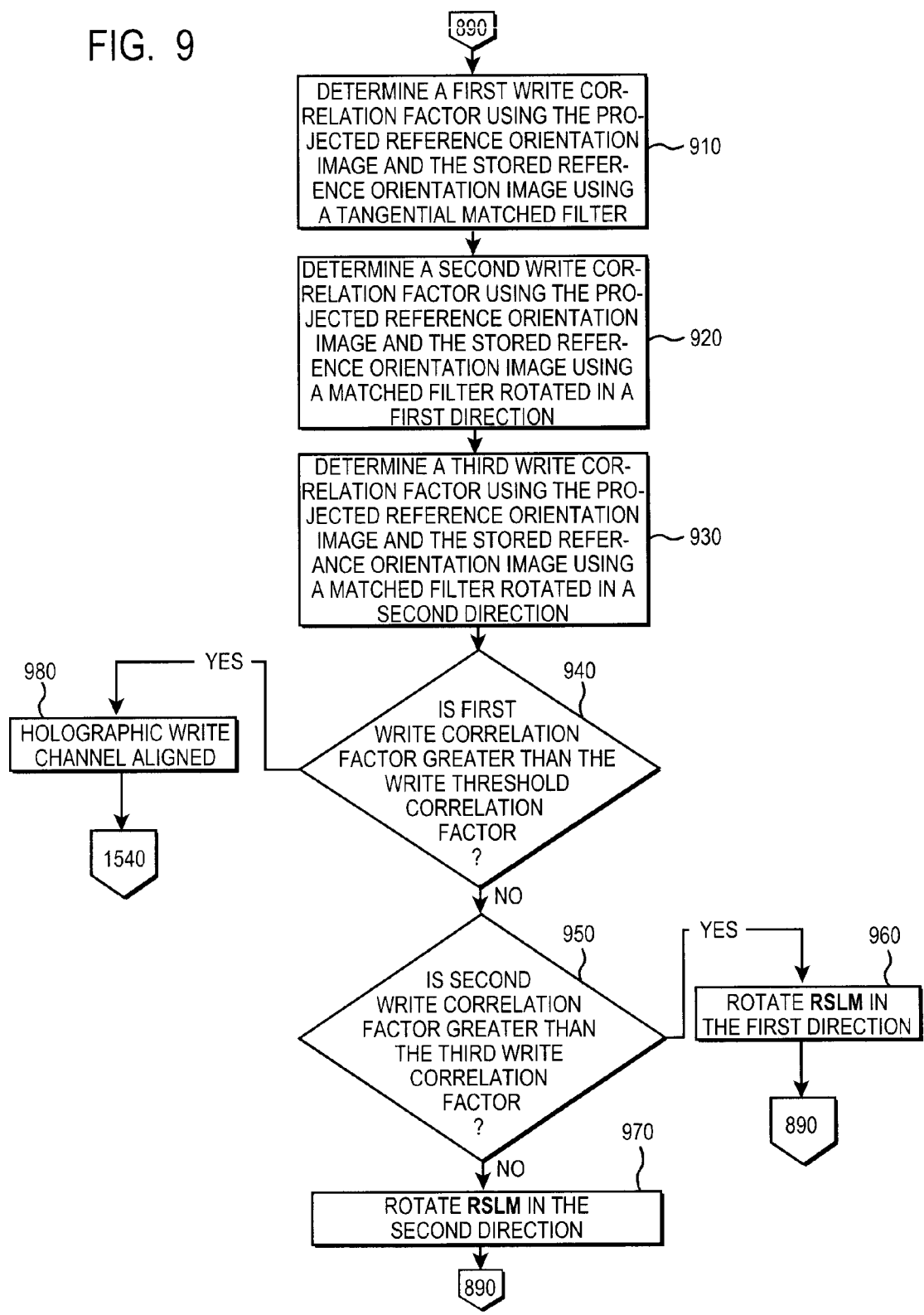
FIG. 9 is a flow chart summarizing certain additional steps of Applicants' method to align Applicants' spatial light modulator.

Applicants' method transitions from step 890 to step 910 (FIG. 9). Referring now to FIG. 9, in step 910 Applicants' method determines a first write correlation factor using the write reference orientation image projected onto the optical detector in step 890 (FIG. 8), the stored write reference orientation image of step 810, and a tangential matched filter, such as for example Applicants' first matched filter 234 (FIGS. 2A, 7). Referring now to FIG. 12, image 1200 comprises reference orientation image 231 (FIGS. 2A, 7) as seen through Applicants' tangential matched filter 234 (FIGS. 2A, 7), wherein the X' axis of image is 1200 parallel to the X axis of optical detector 410 (FIGS. 1A, 4A, 4B, 5A, 6), and wherein the Y' axis of image 1200 is parallel to the Y axis of optical detector 410 (FIGS. 1A, 4A, 4B, 5A, 6), and wherein the Z' axis of image 1200 is parallel to the Z axis of optical detector 410 (FIGS. 1A, 4A, 4B, 5A, 6).

In certain embodiments, step 910 is performed by a processor, such as processor 220 (FIG. 2A), disposed within Applicants' RSLM 210 (FIGS. 1A, 1B, 2, 3). In certain embodiments, step 910 is performed by a processor, such as processor 764 (FIG. 7), disposed within Applicants' storage controller 760 (FIG. 7).

In certain embodiments, in step 910 Applicants' method calculates the difference between the projected orientation image $g(x,y)$ the impulse response $h(x,y)=s*(-x,-y)$ of the image 1200 (FIG. 12). Referring now to Equation (1), $V(x,y)$ for step 1160 comprises the cross-correlation between the projected orientation image and image 1300 $s(x,y)$. As those skilled in the art will appreciate, Equation (1) comprises a double integral, meaning that the integration is over the X axis and Y axis directions of the input screen portion of the optical detector. Additionally, ξ is the integration variable along that X axis, η is the integration variable along that Y axis, and * denotes a complex conjugate.

$$V(x,y) = \iint g(\xi,\eta) s^*(\xi-x, \eta-y) d\xi d\eta \quad (1)$$

Mathematically, V(x,y) comprises a surface varying along the X axis and the Y axis, for each (x,y). There is one value of V(x,y) for each detector element in detector 510. In certain embodiments, the range V(x,y) for each (x,y) is between −1 and +1, wherein +1 represents the ideal correlation of one hundred (100%). To maximize V(x,y), the following difference surface, Difference (x,y), is defined in Equation (2).

$$\text{Difference}(x,y) = 1 - V(x,y) \quad (2)$$

Difference(x,y) is calculated by subtracting the matched filter correlation V(x,y) from unity. In certain embodiments, Difference(x,y) is evaluated (a) point-to-point. In certain embodiments, Difference(x,y) is evaluated as an arithmetic mean. In certain embodiments, Difference(x,y) is evaluated as a geometric mean. In certain embodiments, Difference(x, y) is evaluated as a root-mean-square. In certain embodiments, Difference(x,y) ranges between 0 and +2, wherein the ideal difference for each value of (x,y) is 0, meaning for a value of 0 that there is no difference between the projected orientation image and the reference orientation image at that point (x,y).

In certain embodiments, Difference(x,y) is evaluated point-by-point. In other embodiments, Applicants have found it advantageous to quantify surface Difference(x,y) in terms of a single number, i.e. a correlation factor. In certain embodiments, the first write correlation factor of step 910, and/or the write second correlation factor of step 920, and/or the third write correlation factor of step 930, comprises a MAX_Difference which is equal to the maximum value of Difference (x,y). In certain embodiments, the first write correlation factor of step 910, and/or the second write correlation factor of step 920, and/or the third write correlation factor of step 930 comprises an AM_Difference comprising the arithmetic mean of the values of Difference(x,y). In still other embodiments, the In certain embodiments, the first write correlation factor of step 910, and/or the second write correlation factor of step 920, and/or the third write correlation factor of step 930, comprises a GM_Difference comprising the geometric mean of the values of Difference(x,y). In yet other embodiments, In certain embodiments, the first write correlation factor of step 910, and/or the second write correlation factor of step 920, and/or the third write correlation factor of step 930, comprises an RMS_Difference comprising the root-mean-square of the values of Difference(x,y).

In step 920, Applicants' method determines a second write correlation factor using the reference orientation image projected onto the optical detector in step 890 (FIG. 8), the stored write reference orientation image of step 810, and a first rotated matched filter, such as Applicants' second matched filter 536 (FIGS. 5A, 7). Referring now to FIG. 13, image 1300 comprises reference image 231 as seen through Applicants' first rotated matched filter, wherein neither the X' axis nor the Y' axis of image 1300 is parallel to the X axis of the optical detector, but wherein the Z' axis of image 1300 is parallel to the Z axis of the optical detector.

The X' axis of image 1300 is rotated in a first direction from the X axis of optical detector about the Z axis. In certain embodiments, the X' axis of image 1300 is rotated about the Z axis an increment of up to about one degree in a first direction from the X axis of optical detector. The second correlation factor is calculated using Equations (1) and (2) as described hereinabove.

In certain embodiments, step 920 is performed by a processor, such as processor 220 (FIG. 2A), disposed within Applicants' RSLM 210 (FIGS. 1A, 3, 4A, 4B). In certain embodiments, step 920 is performed by a processor, such as processor 764 (FIG. 7), disposed within Applicants' storage controller 760 (FIG. 7).

Figure 14:
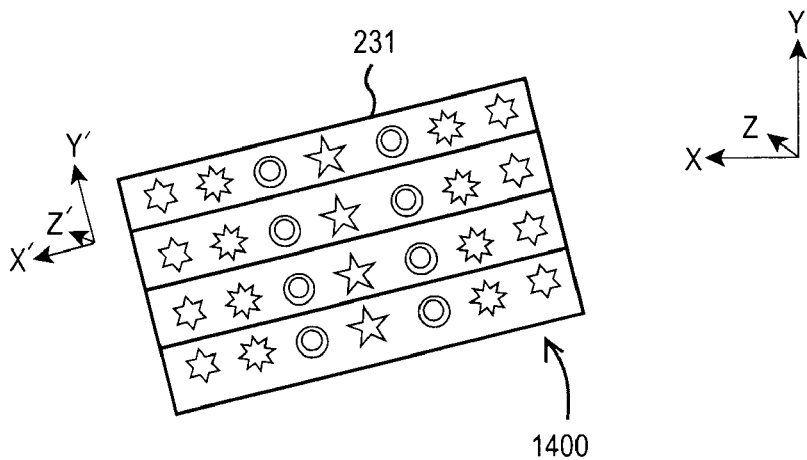
FIG. 14 shows one embodiment of Applicants' write reference orientation image as seen through a second rotated matched filter.

In step 930, Applicants' method determines a third write correlation factor using the write reference orientation image projected onto the optical detector in step 890 (FIG. 8), the stored write reference orientation image of step 810 (FIG. 8), and a second rotated matched filter, such as Applicants' third matched filter 238 (FIGS. 2A, 7). Referring now to FIG. 14, image 1400 comprises write reference orientation image 231 (FIGS. 2A, 7) as seen through Applicants' second rotated matched filter, wherein neither the X' axis nor the Y' axis of image 1400 is parallel to the X axis of the optical detector, but wherein the Z' axis of image 1400 is parallel to the Z axis of the optical detector.

The X axis of the image 1400 is rotated in a second direction from the X axis of optical detector about the Z axis. In certain embodiments, the X' axis of image 1400 is rotated about the Z axis an increment of up to about one degree in the second direction from the X axis of optical detector. The third correlation factor is calculated using Equations (1) and (2) as described hereinabove.

In certain embodiments, step 930 is performed by a processor, such as processor 220 (FIG. 2A), disposed within Applicants' RSLM 210 (FIGS. 1A, 2A, 3, 4A, 4B). In certain embodiments, step 930 is performed by a processor, such as processor 420 (FIG. 4), disposed within Applicants' optical detector 410 (FIGS. 1A, 4A, 4B, 5A, 6). In certain embodiments, step 930 is performed by a processor, such as processor 764 (FIG. 7), disposed within Applicants' storage controller 760 (FIG. 7).

Applicants' method transitions from step 930 to step 940 wherein Applicants' method determines if the first write correlation factor of step 910 is greater than or equal to the write threshold correlation factor of step 870 (FIG. 8). In certain embodiments, step 940 is performed by a processor, such as processor 220 (FIG. 2A), disposed within Applicants' RSLM 110 (FIGS. 1A, 2A, 3, 4A, 4B). In certain embodiments, step 940 is performed by a processor, such as processor 764 (FIG. 7), disposed within Applicants' storage controller 760 (FIG. 7).

If Applicants' method determines in step 940 that the first write correlation factor of step 910 is greater than or equal to the write threshold correlation factor of step 870, then the method transitions from step 940 to step 980 wherein the method places the holographic data storage system of step 805 in an encode information status.

If Applicants' method determines in step 940 that the first write correlation factor of step 910 is not greater than or equal to the threshold write correlation factor of step 870, then the method transitions from step 940 to step 950 wherein the method determines if the second write correlation factor of step 920 is greater than the third write correlation factor of step 930. In certain embodiments, step 950 is performed by a processor, such as processor 220 (FIG. 2A), disposed within Applicants' RSLM 210 (FIGS. 1, 2, 3). In certain embodiments, step 950 is performed by a processor, such as processor 420 (FIG. 4), disposed within Applicants' optical detector 410 (FIGS. 1A, 4A, 4B, 5A, 6). In certain embodiments, step 950 is performed by a processor, such as processor 764 (FIG. 7), disposed within Applicants' storage controller 760 (FIG. 7).

If Applicants' method determines in step 950 that the second write correlation factor of step 920 is greater than the third write correlation factor of step 930, then the method transitions from step 950 to step 960 wherein the method rotates the RSLM about the Z axis in the first direction. In certain embodiments, Applicants' method rotates the RSLM about the Z axis an increment of about two degrees (2°). Applicants' method transitions from step 960 to step 890 (FIG. 8) and continues as described herein.

In certain embodiments, in step 960 a processor, such as processor 220 (FIG. 2A), disposed within Applicants' RSLM, such as RSLM 110 (FIGS. 1A, 2A, 3, 4A, 4B), causes a servo comprising a shaft extending outwardly therefrom and attached to the display screen element of Applicants' RSLM, such as PES 240 (FIG. 2A) and rotatable shaft 250 (FIG. 2A), disposed in Applicants' RSLM to rotate about two degrees in the first direction. In certain embodiments, in step 960 a processor, such as processor 764 (FIG. 7), disposed within Applicants' storage controller, such as storage controller 700 (FIG. 7), causes a servo comprising a shaft extending outwardly therefrom and attached to the display screen element of Applicants' RSLM, such as PES 240 (FIG. 2A) and rotatable shaft 250 (FIG. 2A), disposed in Applicants' RSLM to rotate about two degrees in the first direction.

If Applicants' method determines in step 950 that the second write correlation factor of step 920 is not greater than the third write correlation factor of step 930, then the method transitions from step 950 to step 970 wherein the method rotates the display screen element of Applicants' RSLM about the Z axis in the second direction. In certain embodiments, in step 970 Applicants' method rotates the display screen about the Z axis in the second direction an increment of about two degrees (2°). Applicants method transition from step 970 to step 890 and continues as described herein.

In certain embodiments, in step 970 a processor, such as processor 220 (FIG. 2A), disposed within Applicants' RSLM, such as RSLM 110 (FIGS. 1A, 2A, 3, 4A, 4B), causes a servo comprising a shaft extending outwardly therefrom and attached to the display screen element of Applicants' RSLM, such as PES 240 (FIG. 2A) and rotatable shaft 250 (FIG. 2A), disposed in Applicants' RSLM to rotate about two degrees in the second direction. In certain embodiments, in step 970 a processor, such as processor 764 (FIG. 7), disposed within Applicants' storage controller, such as storage controller 700 (FIG. 7), causes a servo comprising a shaft extending outwardly therefrom and attached to the display screen element of Applicants' RSLM, such as PES 240 (FIG. 2A) and rotatable shaft 250 (FIG. 2A), disposed in Applicants' RSLM to rotate about two degrees in the second direction.

In certain embodiments, individual steps recited in FIGS. 8, 9, 10, and/or 11, may be combined, eliminated, or reordered.

In certain embodiments, Applicants' invention includes instructions, such as instructions 231 (FIG. 2A) residing memory 230 (FIG. 2A) and/or in memory 763 (FIG. 7), where those instructions are executed by a processor, such as processor 220 (FIG. 2A) and/or processor 764 (FIG. 7), respectively, to perform one or more of steps 910, 920, 930, 940, 950, 960, 970, and/or 980 recited in FIG. 9. In certain embodiments, Applicants' invention includes instructions, such as instructions 531 (FIG. 5A) residing memory 530 (FIG. 5A) and/or in memory 763 (FIG. 7), where those instructions are executed by a processor, such as processor 520 (FIG. 2A) and/or processor 764 (FIG. 7), respectively, to perform one or more of steps 1050, 1060, 1070, recited in FIG. 10, and/or one or more of steps 1110, 1120, 1130, 1140, and/or 1150, recited in FIG. 11.

Figure 11:
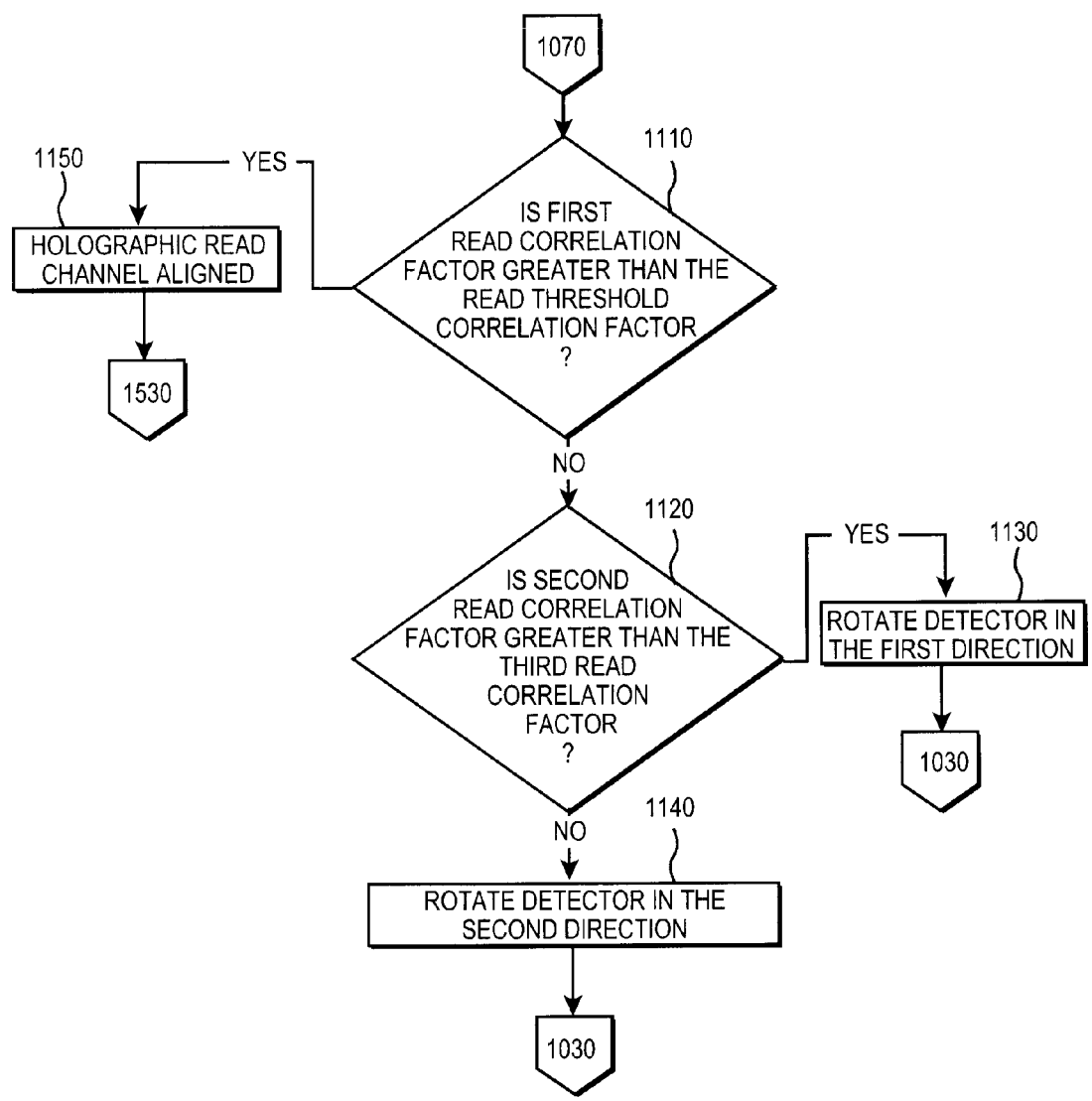
FIG. 11 is a flow chart summarizing certain additional steps of Applicants' method to align Applicants' optical detector.

In other embodiments, Applicants' invention includes instructions residing in any other computer program product, where those instructions are executed by a computer external to, or internal to, system 100, to perform one or more of steps 910, 920, 930, 940, 950, 960, 970, and/or 980 recited in FIG. 9, and/or one or more of steps 1050, 1060, 1070, recited in FIG. 10, and/or one or more of steps 1110, 1120, 1130, 1140, and/or 1150, recited in FIG. 11. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to align a spatial light modulator disposed in a holographic data storage system, comprising the steps of:
   supplying a holographic data storage system comprising a light source, a stored write reference orientation image, a tangential matched filter, a first rotated matched filter, a second rotated matched filter and an optical detector;
   providing a holographic data storage medium encoded with said write reference orientation image;
   providing a reference beam;
   establishing a write threshold correlation factor;
   illuminating said encoded holographic data storage medium with said reference beam to generate a write channel alignment data beam comprising a projected write reference orientation image;
   projecting said write channel alignment data beam onto said optical detector;
   calculating a first write correlation factor using said projected write reference orientation image, said stored write reference orientation image, and said tangential matched filter;
   determining if said first write correlation factor is greater than or equal to said write threshold correlation factor.

2. The method of claim 1, wherein said supplying step further comprises supplying a spatial light modulator comprising a display screen, a servo comprising a rotatable shaft extending outwardly therefrom and interconnected with said display screen.

3. The method of claim 2, wherein said supplying a spatial light modulator step further comprises supplying a reflective spatial light modulator.

4. The method of claim 2, further comprising the steps of:
   calculating a second write correlation factor using said projected write reference orientation image, said stored write reference orientation image, and said first rotated matched filter;
   calculating a third write correlation factor using said projected write reference orientation image, said stored write reference orientation image, and said second rotated matched filter;
   operative if said first write correlation factor is not greater than or equal to said write threshold correlation factor, determining if said second write correlation factor is greater than said third write correlation factor;

operative if said second write correlation factor is greater than said third write correlation factor, rotating said display screen in said first direction; and operative if said second correlation factor is not greater than said third correlation factor, rotating said display screen in said second direction.

5. The method of claim 4, wherein:

said supplying step further comprises supplying a spatial light modulator comprising, a processor, memory, microcode written to said memory;

said processor is interconnected with said servo, and wherein said threshold write correlation factor, said tangential matched filter, said first rotated matched filter, and said second rotated matched filter are written to said memory;

said processor performs said calculating a first write correlation factor step, said calculating a second write correlation factor step, said calculating a third write correlation factor step, said determining if said first write correlation factor is greater than or equal to said threshold write correlation factor, and said determining if said second write correlation factor is greater than said third write correlation factor step.

6. The method of claim 4, wherein:

said supplying step further comprises supplying a storage controller comprising, a processor, memory, microcode written to said memory;

said processor is interconnected with said servo, and wherein said threshold write correlation factor, said tangential matched filter, said first rotated matched filter, and said second rotated matched filter are written to said memory;

said processor performs said calculating a first write correlation factor step, said calculating a second write correlation factor step, said calculating a third write correlation factor step, said determining if said first write correlation factors is greater than or equal to said write threshold correlation factor, and said determining if said second write correlation factor is greater than said third write correlation factor step.

7. The method of claim 1, wherein said supplying step further comprises supplying a holographic data storage medium and a spatial light modulator, and wherein said providing a holographic data storage medium comprising an encoded write reference orientation image comprises the steps of:

displaying said stored write reference orientation image on said spatial light modulator;

generating a write data beam comprising said write reference orientation image;

forming a hologram using said write data beam and said reference beam; and encoding said hologram in said holographic data storage medium to form said holographic data storage medium comprising an encoded write reference orientation image.

8. A spatial light modulator disposed in a holographic data storage system, said spatial light modulator comprising a display screen, a processor, a computer readable medium, a write threshold correlation factor, a write reference orientation image, a tangential matched filter, a first rotated matched filter, and a second rotated matched filter, encoded in said computer readable medium, computer readable program code encoded in said computer readable medium, said computer readable program code being useable with said processor to align said spatial light modulator, the computer readable program code comprising a series of computer readable program steps to effect:

receiving from an interconnected optical detector a projected write reference orientation image;

calculating a first write correlation factor using said projected write reference orientation image, said write reference orientation image encoded in said computer readable medium, and said tangential matched filter;

determining if said first write correlation factor is greater than or equal to said threshold write correlation factor.

9. The spatial light modulator of claim 8, said computer readable program code further comprising a series of computer readable program steps to effect:

calculating a second write correlation factor using said projected write reference orientation image, said write reference orientation image encoded in said computer readable medium, and said first rotated matched filter;

calculating a third write correlation factor using said projected write reference orientation image, said write reference orientation image encoded in said computer readable medium, and said second rotated matched filter.

10. The spatial light modulator of claim 9, further comprising a servo comprising a rotatable shaft extending outwardly therefrom and interconnected with said display screen.

11. The spatial light modulator of claim 10, said computer readable program code further comprising a series of computer readable program steps to effect:

operative if said first write correlation factor is not greater than or equal to said threshold write correlation factor, determining if said second write correlation factor is greater than said third write correlation factor;

operative if said second write correlation factor is greater than said third write correlation factor, rotating said display screen in said first direction; and operative if said second write correlation factor is not greater than said third write correlation factor, rotating said display screen in said second direction.

* * * * *